(12) United States Patent
Choi et al.

(10) Patent No.: US 11,071,097 B2
(45) Date of Patent: Jul. 20, 2021

(54) METHOD AND DEVICE FOR TRANSMITTING UPLINK CONTROL CHANNEL IN WIRELESS COMMUNICATION SYSTEM

(71) Applicant: Samsung Electronics Co., Ltd., Gyeonggi-do (KR)

(72) Inventors: Seunghoon Choi, Gyeonggi-do (KR); Youngbum Kim, Seoul (KR); Taehyoung Kim, Seoul (KR); Juho Lee, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/609,664

(22) PCT Filed: May 2, 2018

(86) PCT No.: PCT/KR2018/005087
§ 371 (c)(1),
(2) Date: Oct. 30, 2019

(87) PCT Pub. No.: WO2018/203657
PCT Pub. Date: Nov. 8, 2018

(65) Prior Publication Data
US 2020/0154427 A1 May 14, 2020

(30) Foreign Application Priority Data
May 4, 2017 (KR) .................. 10-2017-0056876

(51) Int. Cl.
*H04W 72/04* (2009.01)
(52) U.S. Cl.
CPC ... *H04W 72/0413* (2013.01); *H04W 72/0446* (2013.01)
(58) Field of Classification Search
None
See application file for complete search history.

(56) References Cited

U.S. PATENT DOCUMENTS 10,470,167 B2 * 11/2019 Lee .................. H04W 72/1273
2011/0243066 A1 * 10/2011 Nayeb Nazar ........ H04L 1/1671
370/328
(Continued)

FOREIGN PATENT DOCUMENTS

| EP | 3 589 049 | 1/2020 |
| KR | 1020180122805 | 11/2018 |

OTHER PUBLICATIONS

Guangdong OPPO Mobile Telecom, "Slot aggregation and configuration for NR long PUCCH," 3GPP TSG RAN WG meeting #88bis, Spokane, Washington, US, Mar. 3, 2017.*
(Continued)

*Primary Examiner* — Andrew C Oh
(74) *Attorney, Agent, or Firm* — The Farrell Law Firm, P.C.

(57) ABSTRACT

The present disclosure relates to a communication method and system for converging a 5$^{th}$-Generation (5G) communication system for supporting higher data rates beyond a 4$^{th}$-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. A control method by a terminal, according to one embodiment of the present invention, can comprise the steps of: receiving PUCCH configuration information, which includes first information on a PUCCH resource and second information on the number of slots for repeatedly transmitting PUCCH; and determining, on the basis of the PUCCH configuration information and slot format information, the slots by which the PUCCH is to be repeatedly transmitted.

15 Claims, 14 Drawing Sheets

(56) References Cited

U.S. PATENT DOCUMENTS

| | | | |
|---|---|---|---|
| 2013/0107852 A1* | 5/2013 | Han | H04L 5/001 370/329 |
| 2015/0131579 A1* | 5/2015 | Li | H04L 1/1858 370/329 |
| 2016/0226649 A1* | 8/2016 | Papasakellariou | H04L 1/08 |
| 2016/0262182 A1* | 9/2016 | Yang | H04L 1/1858 |
| 2016/0285535 A1* | 9/2016 | Kim | H04B 7/0632 |
| 2016/0330633 A1* | 11/2016 | You | H04J 11/0079 |
| 2016/0338088 A1 | 11/2016 | Fakoorian et al. | |
| 2016/0381674 A1* | 12/2016 | Kim | H04L 1/189 370/329 |
| 2017/0164352 A1* | 6/2017 | Yang | H04L 5/0053 |
| 2017/0245265 A1* | 8/2017 | Hwang | H04L 5/0055 |
| 2017/0273027 A1* | 9/2017 | Kim | H04W 52/48 |
| 2017/0290001 A1* | 10/2017 | Axmon | H04W 72/0413 |
| 2018/0091280 A1* | 3/2018 | Kim | H04L 5/0057 |
| 2018/0124773 A1* | 5/2018 | Lee | H04L 5/0053 |
| 2018/0279294 A1* | 9/2018 | Gao | H04W 72/14 |
| 2018/0324861 A1 | 11/2018 | Oh et al. | |
| 2019/0098622 A1* | 3/2019 | Lee | H04W 72/0446 |
| 2019/0182824 A1* | 6/2019 | Chatterjee | H04L 5/0053 |

OTHER PUBLICATIONS

CATT, "PUCCH Resource Allocation", R1-1702099, 3GPP TSG RAN WG1 Meeting #88, Feb. 13-17, 2017, 3 pages.

European Search Report dated Feb. 17, 2020 issued in counterpart application No. 18794511.8-1215, 8 pages.

PCT/ISA/210 Search Report issued on PCT/KR2018/005087, pp. 5.

PCT/ISA/237 Written Opinion issued on PCT/KR2018/005087, pp. 6.

Guangdong OPPO Mobile Telecom, 3GPP TSG RAN WG1 meeting #88bis, R1-1704623, Spokane, Washington USA, Mar. 24, 2017, "Slot aggregation and configuration for NR long PUCCH", pp. 7.

Huawei, HiSilicon, 3GPP TSG RAN WG1 Meeting #88bis, R1-1704211, Spokane USA, Mar. 25, 2017, "NR-PUCCH resource determination", pp. 6.

LG Electronics, 3GPP TSG RAN WG1 Meeting #88bis, R1-1704910, Spokane USA, Mar. 25, 2017, Resource configuration for long NR-PUCCH, pp. 7.

Samsung, 3GPP TSG RAN WG1 Meeting #88bis, R1-1705390, Spokane USA, Mar. 25, 2017, "UL Control Channel: Long Format", pp. 5.

* cited by examiner

METHOD AND DEVICE FOR TRANSMITTING UPLINK CONTROL CHANNEL IN WIRELESS COMMUNICATION SYSTEM

PRIORITY

This application is a National Phase Entry of PCT International Application No. PCT/KR2018/005087 which was filed on May 2, 2018, and claims priority to Korean Patent Application No. 10-2017-0056876, which was filed on May 4, 2017, the content of each of which is incorporated herein by reference.

TECHNICAL FIELD

The disclosure relates to a method and an apparatus for transmitting an uplink control channel in a wireless cellular communication system.

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

Meanwhile, a need of a method of transmitting a PUCCH in a 5G communication system has appeared.

DISCLOSURE OF INVENTION

Technical Problem

The disclosure relates to a method of transmitting a long PUCCH in a plurality of slots, and provides a method of configuring repetitive long PUCCH transmission and a method and an apparatus by which a terminal performs long PUCCH transmission in a plurality of slots according to the method of configuring the repetitive long PUCCH transmission when there is a slot through which long PUCCH transmission cannot be performed during transmission in the plurality of slots or when long PUCCH transmission cannot be performed in the number of OFDM symbols configured in a specific slot.

Solution to Problem

In accordance with an aspect of the disclosure, a method of controlling a terminal in a wireless communication system is provided. The method includes: receiving PUCCH configuration information including first information on PUCCH resources and second information on a number of slots for repeatedly transmitting a PUCCH; and determining slots for repeatedly transmitting the PUCCH based on the PUCCH configuration information and slot format information.

In accordance with another aspect of the disclosure, a terminal is provided. The terminal includes: a transceiver configured to transmit and receive a signal; and a controller configured to control the transceiver to receive PUCCH configuration information including first information on PUCCH resources and second information on a number of slots for repeatedly transmitting a PUCCH and perform control to determine the slots for repeatedly transmitting the PUCCH based on the PUCCH configuration information and slot format information.

In accordance with another aspect of the disclosure, a method of controlling an evolved NodeB (eNB) is provided. The method includes: transmitting PUCCH configuration information including first information on PUCCH resources and second information on a number of slots for repeatedly transmitting a PUCCH; and repeatedly receiving the PUCCH through slots determined by a terminal based on the PUCCH configuration information and slot format information.

In accordance with another aspect of the disclosure, an evolved NodeB (eNB) is provided. The eNB includes: a transceiver configured to transmit and receive a signal; and a controller configured to control the transceiver to transmit PUCCH configuration information including first information on PUCCH resources and second information on a number of slots for repeatedly transmitting a PUCCH and repeatedly receive the PUCCH through slots determined by a terminal based on the PUCCH configuration information and slot format information.

Advantageous Effects of Invention

An embodiment of the disclosure relates to a method of transmitting a long PUCCH in a plurality of slots, and through a method of configuring repetitive long PUCCH transmission and a method by which the terminal performs long PUCCH transmission in the plurality of slots when there is a slot through which long PUCCH transmission cannot be performed during transmission or when long PUCCH transmission cannot be performed through the number of OFDM symbols configured in a specific slot, it is possible to improve uplink transmission coverage of the terminal.

MODE FOR THE INVENTION

Figure 1:
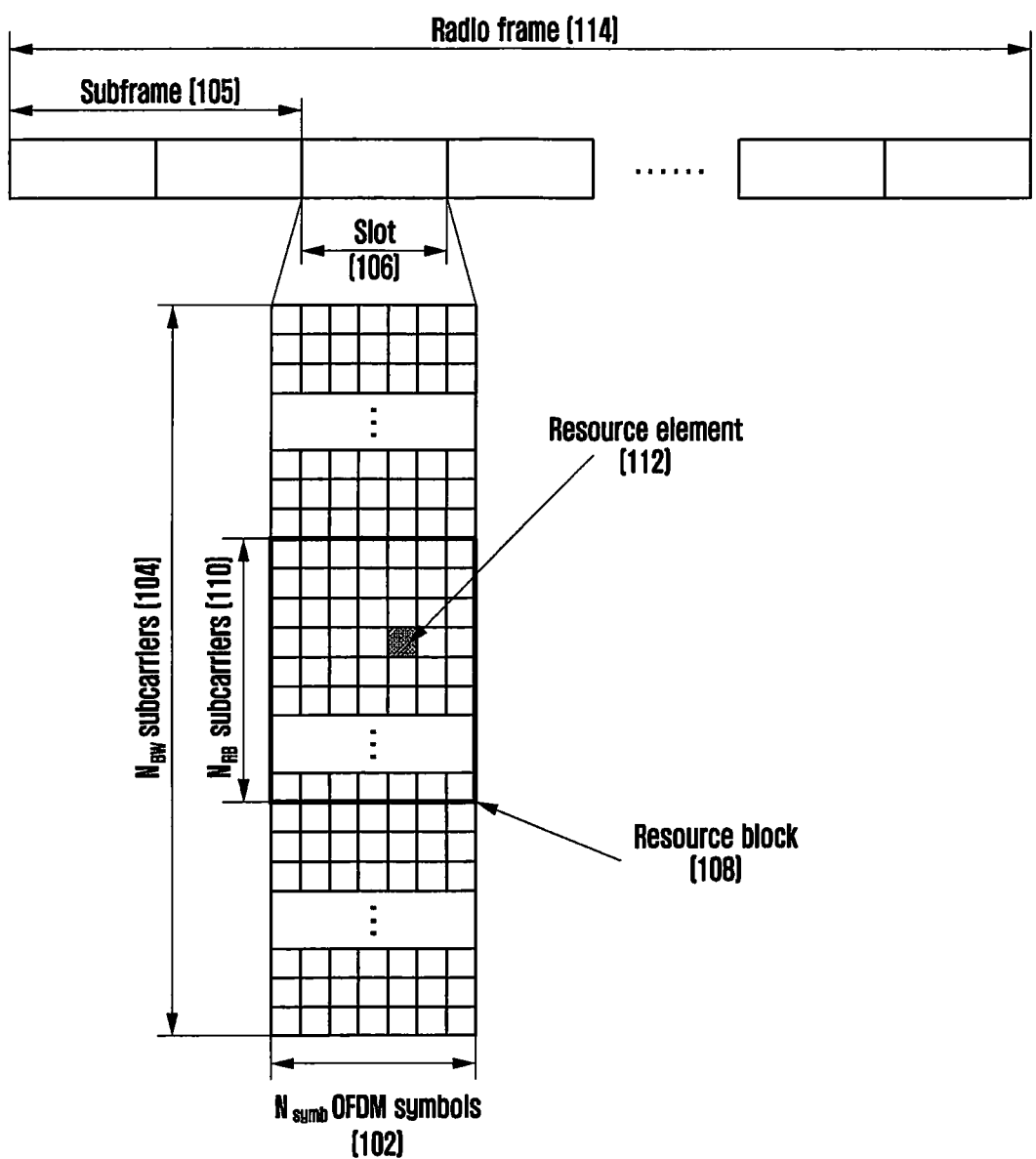
FIG. 1 illustrates the basic structure of time-frequency regions in the LTE system.

Hereinafter, embodiments of the disclosure will be described in detail with reference to the accompanying drawings. In the following description of the disclosure, a detailed description of known functions or configurations incorporated herein will be omitted when it may make the subject matter of the disclosure rather unclear. The terms which will be described below are terms defined in consideration of the functions in the disclosure, and may be different according to users, intentions of the users, or customs. Therefore, the definitions of the terms should be made based on the contents throughout the specification.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

And each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, "unit" or divided into a larger number of elements, "unit". Moreover, the elements and "units" may be implemented to reproduce one or more CPUs within a device or a security multimedia card.

Hereinafter, embodiments of the disclosure will be described in detail with reference to the accompanying drawings. In the following description of the disclosure, a detailed description of known functions or configurations incorporated herein will be omitted when it may make the subject matter of the disclosure rather unclear. The terms which will be described below are terms defined in consideration of the functions in the disclosure, and may be different according to users, intentions of the users, or customs. Therefore, the definitions of the terms should be made based on the contents throughout the specification.

Further, the detailed description of embodiments of the disclosure is made mainly based on a wireless communication system based on OFDM, particularly 3GPP EUTRA standard, but the subject matter of the disclosure can be applied to other communication systems having a similar technical background and channel form after a little modification without departing from the scope of the disclosure and the above can be determined by those skilled in the art.

Meanwhile, research on the coexistence of new 5G communication (or called NR communication in the disclosure) and conventional LTE communication in the same spectrum in a mobile communication system is being conducted.

The disclosure relates to a wireless communication system and, more particularly, to a method and an apparatus in which a terminal capable of transmitting and receiving data in at least one of different wireless communication systems existing in one carrier frequency or a plurality of carrier frequencies transmits and receives data to and from each of the communication systems.

In general, a mobile communication system is developed to provide voice services while guaranteeing mobility of users. The mobile communication system has gradually expanded its service scope from voice to data services. In recent years, the mobile communication system has evolved to a degree that it can provide high-speed data services. Though, since resources are lacking and users demand higher speed services in the mobile communication system providing a current service, a further improved mobile communication system is needed.

To meet the demands, standardization of long term evolution (LTE) is being conducted by the 3rd generation partnership project (3GPP) as one of the next generation mobile communication systems that are being developed. LTE is a technology of implementing high speed packet-based communication with a transmission rate of up to about 100 Mbps. To this end, several methods are being discussed, including a method of reducing the number of nodes located on a communication channel by simplifying a network architecture or a method of making wireless protocols the closest to a wireless channel.

When decoding fails at the initial transmission, the LTE system employs hybrid automatic repeat request (HARQ) that retransmits the corresponding data on a physical layer. In the HARQ scheme, when a receiver does not accurately decode data, the receiver transmits information (negative acknowledgement: NACK) informing a transmitter of a decoding failure and thus the transmitter may re-transmit the corresponding data on the physical layer. The receiver increases data reception performance by combining the data retransmitted by the transmitter with the data of which decoding has previously failed. Also, when the receiver accurately decodes data, the receiver transmits information (acknowledgement: ACK) informing the transmitter of decoding success and thus the transmitter may transmit new data.

FIG. 1 illustrates the basic structure of time-frequency regions, which are radio resource regions where data or a control channel is transmitted in a downlink of an LTE system.

Referring to FIG. 1, the horizontal axis indicates the time region and the vertical axis indicates the frequency region. A minimum transmission unit in the time region is an OFDM symbol. One slot 106 consists of $N_{symb}$ OFDM symbols 102 and one subframe 105 consists of 2 slots. The length of one slot is 0.5 ms, and the length of one subframe is 1.0 ms. A radio frame 114 is a time region interval consisting of 10 subframes. A minimum transmission unit in the frequency region is a subcarrier, and the bandwidth of an entire system transmission band consists of a total of $N_{BW}$ subcarriers 104.

A basic unit of resources in the time-frequency regions is a resource element (RE) 112 and may be indicated by an OFDM symbol index and a subcarrier index. A resource block (RB or physical resource block (PRB)) 108 is defined by $N_{symb}$ consecutive OFDM symbols 102 in the time region and $N_{RB}$ consecutive subcarriers 110 in the frequency region. Accordingly, one RB 108 may include $N_{symb} \times N_{RB}$ REs 112 in one slot. In general, a minimum transmission unit of data is the RB. In the LTE system, generally, $N_{symb}=7$ and $N_{RB}=12$. $N_{BW}$ and $N_{RB}$ are proportional to a system transmission bandwidth. The data rate increases in proportion to the number of RBs scheduled for the terminal. The LTE system defines and operates 6 transmission bandwidths. In the case of an FDD system, in which the downlink and the uplink are divided according to frequency, a downlink transmission bandwidth and an uplink transmission bandwidth may be different from each other. A channel bandwidth may indicate an RF bandwidth corresponding to a system transmission bandwidth. Table 1 provided below indicates a relationship between a system transmission bandwidth and a channel bandwidth defined in the LTE system. For example, when the LTE system has a channel bandwidth of 10 MHz, the transmission bandwidth may consist of 50 RBs.

TABLE 1

| | Channel bandwidth $BW_{channel}$[MHz] | | | | | |
|---|---|---|---|---|---|---|
| | 1.4 | 3 | 5 | 10 | 15 | 20 |
| Transmission bandwidth configuration | 6 | 15 | 25 | 50 | 75 | 100 |

Downlink control information may be transmitted within first N OFDM symbols in the subframe. Generally, N={1, 2, 3}. Accordingly, N may be variable for each subframe according to an amount of control information to be transmitted in the current subframe. The control information may include a control channel transmission interval indicator indicating the number of OFDM symbols via which control information is to be transmitted, scheduling information associated with downlink data or uplink data, a HARQ ACK/NACK signal, or the like.

In the LTE system, the scheduling information of downlink data or uplink data is transmitted from the eNB to the UE through downlink control information (DCI). The uplink (UL) is a radio link through which the terminal transmits data or control signals to the eNB, and the downlink (DL) is a radio link through which the eNB transmits data or control signals to the terminal. The DCI are defined in various formats. A DCI format may be determined and applied for operation, based on whether scheduling information is for uplink data (UP grant) or for downlink data (DL grant), whether it is compact DCI of which the control information is small, whether spatial multiplexing using multiple antennas is applied, whether it is DCI for controlling power, and the like. For example, DCI format 1 corresponding to scheduling control information of downlink data (DL grant) may be configured to include at least the following control information.

Resource allocation type 0/1 flag: indicates whether a resource allocation type is type 0 or type 1. Type 0 applies a bitmap scheme and allocates resources in units of resource block groups (RBGs). In the LTE system, a basic scheduling unit is a resource block (RB)

expressed by time and frequency domain resources, and an RBG includes a plurality of RBs and is used as a basic scheduling unit in the type 0 scheme. Type 1 allows allocation of a predetermined RB in an RBG.

Resource block assignment: indicates RBs allocated to data transmission. Indicated resources are determined according to a system bandwidth and a resource allocation scheme.

Modulation and coding scheme (MCS): indicates a modulation scheme used for data transmission and the size of a transport block, which is data to be transmitted.

HARQ process number: indicates a process number of HARQ.

New data indicator: indicates HARQ initial transmission or HARQ retransmission.

Redundancy version: indicates a redundancy version of HARQ.

Transmit power control (TPC) command for physical uplink control channel (PUCCH): indicates a transmission power control command for a PUCCH which is an uplink control channel.

The DCI is transmitted through a physical downlink control channel (PDCCH) or an enhanced PDCCH (EPDCCH), which is a downlink physical control channel, via a channel-coding and modulation process.

In general, the DCI is channel-coded independently for each terminal, and is then configured and transmitted as an independent PDCCH. In the time region, a PDCCH is mapped and transmitted during the control channel transmission interval. A mapping of the PDCCH in the frequency region is determined by an identifier (ID) of each terminal, and is propagated to the entire system transmission band.

Downlink data is transmitted through a physical downlink shared channel (PDSCH), which is a physical downlink data channel. The PDSCH is transmitted after the control channel transmission interval, and the detailed mapping location in the frequency region and scheduling information such as the modulation scheme are indicated through DCI transmitted through the PDCCH.

Via an MCS formed of 5 bits in the control information included in the DCI, the eNB may report the modulation scheme applied to a PDSCH to be transmitted to the terminal and the size of data (transport block size (TBS)) to be transmitted. The TBS corresponds to the size before channel coding for error correction is applied to the data (TB) to be transmitted by the eNB.

The modulation scheme supported by the LTE system includes Quadrature Phase Shift Keying (QPSK), 16 Quadrature Amplitude Modulation (16QAM), and 64QAM. Modulation orders (Qm) correspond to 2, 4, and 6 respectively. That is, in the case of the QPSK modulation, 2 bits are transmitted per symbol. In the case of the 16QAM modulation, 4 bits are transmitted per symbol. In the case of 64QAM modulation, 6 bits are transmitted per symbol.

Unlike LTE Rel-8, 3GPP LTE Rel-10 has adopted a bandwidth extension technology in order to support a larger amount of data transmission. The technology called bandwidth extension or carrier aggregation (CA) may expand the band and thus increase the amount of data capable of being transmitted through the expanded band compared to the LTE Rel-8 terminal, which transmits data in one band. Each of the bands is called a component carrier (CC), and the LTE Rel-8 terminal is defined to have one component carrier for each of the downlink and the uplink. Further, a group of uplink component carriers connected to downlink component carriers through SIB-2 is called a cell. An SIB-2 connection relation between the downlink component carrier and the uplink component carrier is transmitted through a system signal or a higher layer signal. The terminal supporting CA may receive downlink data through a plurality of serving cells and transmit uplink data.

In Rel-10, if the eNB has difficulty in transmitting a physical downlink control channel (PDCCH) to a particular terminal in a particular serving cell, the eNB may transmit the PDCCH in another serving cell and configure a carrier indicator field (CIF) as a field indicating that the corresponding PDCCH is a physical downlink shared channel (PDSCH) or a physical uplink shared channel (PUSCH) of the other serving cell. The CIF may be configured in the terminal supporting CA. The CIF is determined to indicate another serving cell by adding 3 bits to the PDCCH in a particular serving cell, and the CIF is included only when cross-carrier scheduling is performed, and if CIF is not included, cross-carrier scheduling is not performed. If the CIF is included in downlink allocation information (DL assignment), the CIF is defined to indicate a serving cell to which a PDSCH scheduled by the DL assignment is transmitted. When the CIF is included in uplink resource allocation information (UL grant), the CIF is defined to indicate a serving cell to which a PUSCH scheduled by the UL grant is transmitted.

As described above, carrier aggregation (CA), which is a bandwidth expansion technology, is defined in LTE-10, and thus a plurality of serving cells may be configured in the terminal. The terminal periodically or aperiodically transmits channel information of the plurality of serving cells to the eNB for data scheduling of the eNB. The eNB schedules and transmits data for each carrier, and the terminal transmits A/N feedback of data transmitted for each carrier. LTE Rel-10 is designed to transmit A/N feedback which is a maximum of 21 bits and, when transmission of A/N feedback and transmission of channel information overlap in one subframe, designed to transmit the A/N feedback and discard the channel information. LTE Rel-11 is designed to multiplex A/N feedback and channel information of one cell and transmit the A/N feedback corresponding to a maximum of 22 bits and the channel information of one cell in transmission resources of PUCCH format 3 through PUCCH format 3.

A scenario in which a maximum of 32 serving cells are configured is assumed in LTE-13, and the concept of expanding the number of serving cells up to a maximum of 32 serving cells has been constructed using not only a licensed band but also an unlicensed band. Further, LTE Rel-13 provides an LTE service in an unlicensed band such as a band of 5 GHz in consideration of limitation on the number of licensed bands, such as the LTE frequency, which is called licensed assisted access (LAA). Carrier aggregation technology of LTE is applied to LAA to support an LTE cell, which is a licensed band, as a P cell and an LAA cell, which is an unlicensed band, as an S cell. Accordingly, as in LTE, feedback generated in the LAA cell corresponding to the SCell should be transmitted only in the PCell, and the LAA cell may freely apply a downlink subframe and an uplink subframe. Unless specially mentioned in this specification, "LTE" refers to all technologies evolved from LTE, such as LTE-A and LAA.

Meanwhile, as a post-LTE communication system, a $5^{th}$-generation wireless cellular communication system (hereinafter, referred to as "5G" or "NR" in the specification) should freely reflect the various requirements of users and service providers, so that services that meet various requirements should be supported.

Accordingly, 5G may define various 5G services such as enhanced mobile broadband communication (hereinafter, referred to as eMBB in this specification), massive machine-type communication (hereinafter, referred to as mMTC in this specification), and ultra-reliable and low-latency communications (hereinafter, referred to as URLLC in this specification) by the technology for satisfying requirements selected for 5G services, among requirements of a maximum terminal transmission rate of 20 Gbps, a maximum terminal speed of 500 km/h, a maximum delay time of 0.5 ms, and a terminal access density of 1,000,000 terminals/km$^2$.

For example, in order to provide eMBB in 5G, a maximum transmission speed of the terminal corresponding to 20 Gbps may be provided in downlink and a maximum transmission speed of the terminal corresponding to 10 Gbps may be provided in uplink from the viewpoint of one eNB. Also, the average transmission rate of the terminal that is actually experienced should be increased. In order to satisfy such requirements, improvement of transmission/reception technologies, including a further improved multi-input multi-output transmission technology, is needed.

Also, in order to support an application service such as the Internet of things (IoT), mMTC is being considered for 5G. The mMTC has requirements of supporting access by massive numbers of terminals within a cell, improving coverage of the terminal, increasing effective battery lifetime, and reducing the costs of the terminal in order to efficiently support IoT. IoT connects various sensors and devices to provide a communication function, and thus should support a large number of terminals (for example, 1,000,000 terminals/km$^2$) within a cell. Further, in the mMTC, the terminal is highly likely to be located in a shade area such as the basement of a building or an area that cannot be covered by the cell due to the characteristics of the service, and thus mMTC requires wider coverage than the coverage provided by eMBB. The mMTC is highly likely to be configured by low-price terminals, and it is difficult to frequently change a battery of the terminal, so a long battery life is needed.

Last, the URLLC is cellular-based wireless communication used for a particular purpose and corresponds to a service used for remote control of a robot or a machine device, industrial automation, unmanned aerial vehicles, remote health control, and emergency notification, and thus should provide ultra-low-latency and ultra-reliable communication. For example, the URLLC should meet a maximum delay time shorter than 0.5 ms and also has requirements to provide a packet error rate equal to or lower than 10-5. Therefore, for the URLLC, a transmit time interval (TTI) smaller than that of the 5G service such as the eMBB should be provided and also it is required to design allocation of wide resources in a frequency band.

The services under consideration for adoption in the 5$^{th}$-generation wireless cellular communication system should be provided as a single framework. That is, in order to efficiently manage and control resources, it is preferable to perform control and transmission such that the services are integrated into one system rather than to independently operate the services.

Figure 2:
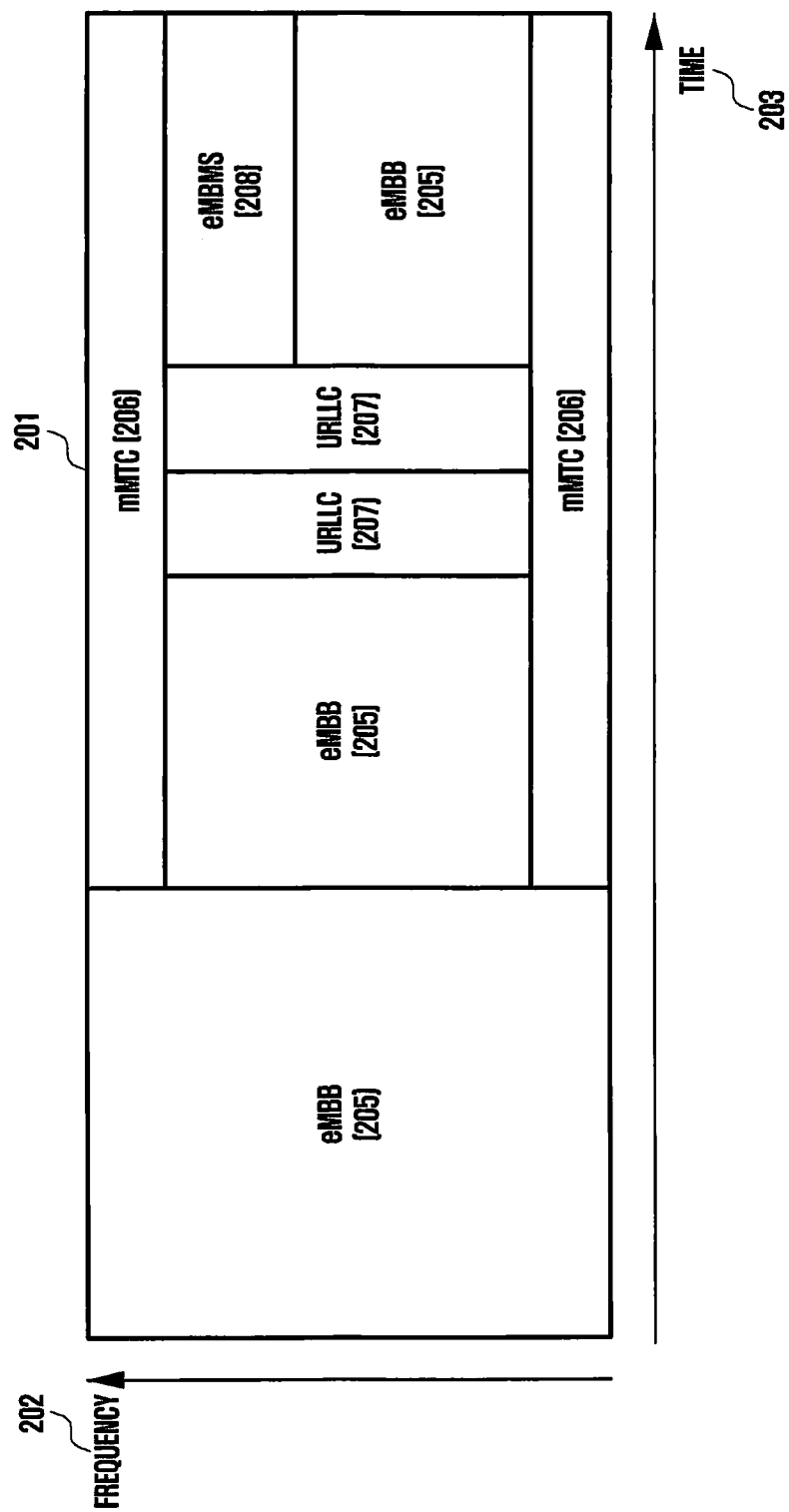
FIG. 2 illustrates an example in which 5G services are multiplexed and transmitted in one system.

FIG. 2 illustrates an example in which services under consideration by 5G are transmitted through one system.

In FIG. 2, frequency-time resources 201 used in 5G may include a frequency axis 202 and a time axis 203. FIG. 2 illustrates an example in which 5G operates eMBB 205, mMTC 206, and URLLC 207 within one framework. Further, as a service which is additionally under consideration for implementation in 5G, an enhanced mobile broadcast/multicast service (eMBMS) 208 for providing a cellular-based broadcast service may be considered. The services considered by 5G, such as the eMBB 205, the mMTC 206, the URLLC 207, and the eMBMS 208 may be multiplexed and transmitted through time division multiplexing (TDM) or frequency division multiplexing (FDM) within one system frequency bandwidth operated by 5G, and spatial division multiplexing may be also considered. In the case of the eMBB 205, it is preferable to occupy and transmit as many frequency bandwidths as possible for a particular time in order to provide the increased data transmission rate. Accordingly, it is preferable that the service of the eMBB 205 be time-division-multiplexed (TDM) with another service within the system transmission bandwidth 201, but it is also preferable that the service of the eMBB 205 be frequency-division-multiplexed (FDM) with other services within the system transmission bandwidth according to the need of the other services.

The mMTC 206 needs an increased transmission interval in order to secure wide coverage unlike other services. Accordingly, transmission of the mMTC 206 may secure the coverage by repeatedly transmitting the same packet within the transmission interval. In order to simultaneously reduce the terminal complexity and the terminal price, the transmission bandwidth within which the terminal is capable of performing reception is limited. When the requirements described above are considered, it is preferable that the mMTC 206 be frequency-division-multiplexed (FDM) with other services within the transmission system bandwidth 201 of 5G.

It is preferable that the URLLC 207 has a shorter transmit time interval (TTI) compared to other services in order to meet ultra-low latency requirements required by the service. Also, in order to meet the ultra-reliability requirement, a low coding rate is needed, so that it is preferable to occupy a wide frequency bandwidth. When the requirements of URLLC 207 are considered, it is preferable that the URLLC 207 be time-division-multiplexed (TDM) with other services within the transmission system bandwidth 201 of 5G.

The aforementioned services may have different transmission/reception schemes and transmission/reception parameters in order to satisfy requirements of the services. For example, the services may have different numerologies depending on the requirements thereof. The numerology includes a cyclic prefix (CP) length, subcarrier spacing, an OFDM symbol length, and a transmission interval length (TTI) in an orthogonal frequency division multiplexing (OFDM) or an orthogonal frequency division multiple access (OFDMA)-based communication system. In an example in which the services have different numerologies, the eMBMS 208 may have a longer CP than other services. Since the eMBMS transmits higher traffic based on broadcasting, the same data may be transmitted in all cells. At this time, if signals received by a plurality of cells reach the CP length, the terminal may receive and decode all of the signals and thus obtain a single frequency network (SFN) diversity gain. Accordingly, even a terminal located at a cell boundary may have an advantage of receiving broadcasting information without any coverage restriction. However, if the CP length is relatively longer than other services, waste occurs due to CP overhead in order to support the eMBMS in 5G, and thus a longer OFDM symbol is required than in the case of other services, which results in narrower sub-carrier spacing compared to other services.

Further, as an example in which different numerologies are used for services in 5G, a shorter OFDM symbol may be required as a shorter TTI is needed compared to other services, and moreover, wider subcarrier spacing may be required in the case of URLLC.

Meanwhile, one TTI may be defined as one slot and may consist of 14 OFDM symbols or 7 OFDM symbols in 5G. Accordingly, in the case of subcarrier spacing of 15 kHz, one slot has a length of 1 ms or 0.5 ms. Further, one TTI may be defined as one mini-slot or sub-slot for emergency transmission and transmission in an unlicensed band in 5G, and one mini-slot may have OFDM symbols ranging from 1 to (the number of OFDM symbols of the slot)−1. If the length of one slot corresponds to 14 OFDM symbols, the length of the mini-slot may be determined as one of 1 to 13 OFDM symbols. The length of the slot or the mini-slot may be defined according to a standard, and may be transmitted through a higher-layer signal or system information and received by the terminal. Instead of the mini-slot or the sub slot, the slot may be determined to have the length from 1 to 14 OFDM symbols, and the length of the slot may be transmitted by a higher layer signal or system information and thus received by the terminal.

The slot or the mini-slot may be defined to have various transmission formats, and may be classified into the following formats.

DL-only slot or full DL slot: includes only downlink sections and supports only downlink transmission.

DL-centric slot: includes downlink sections, GP, and uplink sections, and has a larger number of OFDM symbols in the downlink section than in the uplink section.

UL-centric slot: includes downlink sections, GP, and uplink sections, and has a smaller number of OFDM symbols in the downlink section than those in the uplink section.

UL-only slot or full-DL slot: includes only uplink sections and supports only uplink transmission.

In the above description, only the slot formats are divided, but the mini-slot may be also classified in the same way. For example, the mini-slot may be divided into a DL-only mini-slot, a DL-centric mini-slot, a UL-centric mini-slot, and a UL-only mini-slot.

When the uplink control channel is configured to be transmitted by the terminal in a plurality of slots, a method of configuring repetitive transmission of the long PUCCH is needed. A method by the terminal performs long PUCCH transmission in a plurality of slots is needed when there is a slot through which long PUCCH transmission cannot be performed during transmission or if long PUCCH transmission is not performed over the number of OFDM symbols configured in a specific slot according to a configuration method for repetitive long PUCCH transmission. According to an embodiment of the disclosure, a method by which the eNB indicates a configuration for repetitive long PUCCH transmission to the terminal is provided for transmission and reception of an uplink control channel in the plurality of slots or mini-slots of the eNB and the terminal. A method by which the terminal receives the configuration and transmits the uplink control channel in the plurality of slots or mini-slots is provided. A transmission interval (or a transmission start symbol and end symbol) of the uplink control channel may vary depending on the format of the slots or the mini-slots. The case in which an uplink control channel having a short transmission interval (hereinafter, referred to as a short PUCCH in the disclosure) to minimize a transmission delay and an uplink control channel having a long transmission interval (hereinafter, referred to as a long PUCCH in the disclosure) to acquire sufficient cell coverage coexist in one slot or a plurality of slots and the case in which the uplink control channel is multiplexed in one slot or a plurality of slots, such as transmission of an uplink sounding signal like an SRS, should be considered. Accordingly, a method of determining and transmitting the number of long PUCCH transmission symbols in each slot if the terminal repeatedly performs long PUCCH transmission in a plurality of slots is provided.

Hereinafter, exemplary embodiments of the disclosure will be described in detail with reference to the accompanying drawings. It should be noted that the same elements will be designated by the same reference numerals although they are shown in different drawings. Further, a detailed description of a known function and configuration which may make the subject matter of the disclosure unclear will be omitted.

In addition, although the following detailed description of embodiments of the disclosure will be directed to the LTE and 5G systems, it can be understood by those skilled in the art that the main gist of the disclosure may also be applied to any other communication system having similar technical backgrounds and channel formats, with a slight modification, without substantially departing from the scope of the disclosure.

Hereinafter, the 5G system for transmitting and receiving data in the 5G cell will be described.

Figure 3A:
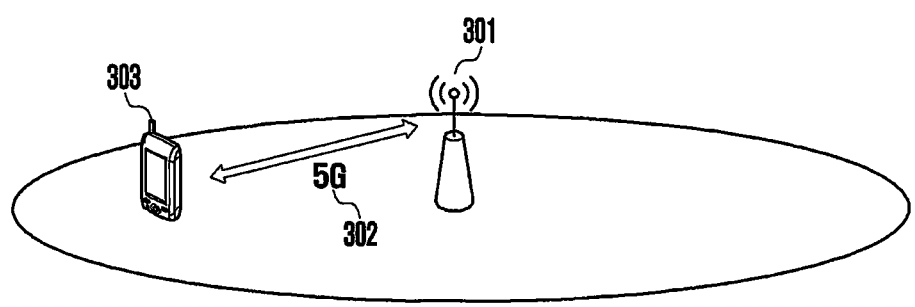
FIGS. 3A to 3C illustrates an embodiment of a communication system to which the disclosure is applied.

FIG. 3A illustrates an embodiment of a communication system to which the disclosure is applied. The above-described figures illustrate the form in which the 5G system is operated, and schemes proposed by the disclosure can be applied to the system of FIG. 3A.

Referring to FIG. 3A, the case in which a 5G cell 302 is operated in one eNB 301 in a network is illustrated. A terminal 303 is a 5G-capable terminal having a 5G transmission/reception module. The terminal 303 may acquire synchronization through a synchronization signal transmitted in the 5G cell 302, receive system information, and transmit and receive data to and from the eNB 301 through the 5G cell 302. In this case, there is no limitation as to the duplexing method of the 5G cell 302. Uplink control transmission may be performed through the 5G cell 302 if the 5G cell is a P cell. In the 5c system, the 5G cell may have a plurality of serving cells, and may support a total of 32 serving cells. It is assumed that the BS 301 includes a 5G transmission/reception module (system) in the network and can manage and operate the 5G system in real time.

Figure 3B:
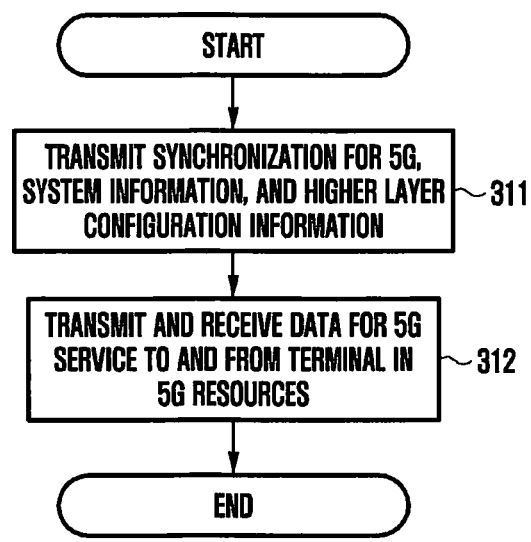

Subsequently, a procedure in which the eNB 301 configures 5G resources and transmits and receives data to and from the 5G-capable terminal 303 in resources for 5G will be described with reference to FIG. 3B.

In step 311, the eNB 301 may transmit synchronization for 5G, system information, and higher-layer configuration information to the 5G-capable terminal 303. With respect to the synchronization signal for 5G, separate synchronization signals may be transmitted for eMBB, mMTC, and URCCL using different numerologies, and a common synchronization signal may be transmitted through specific 5G resources using one numerology. With respect to the system information, common system information may be transmitted through specific 5G resources using one numerology, and separate system information may be transmitted for eMBB, mMTC, and URLLC using different numerologies. The system information and the higher configuration information may include configuration information indicating whether to use the slot or the mini-slot for data transmission and reception, the number of OFDM symbols of the slot or the mini-slot, and the numerology therefor. Further, if reception of a downlink common control channel is configured in the terminal, the system information and the higher configuration information may include configuration information related to reception of the downlink common control channel.

In step 312, the eNB 301 may transmit and receive data for the 5G service to and from the 5G-capable terminal 303 in 5G resources.

Figure 3C:
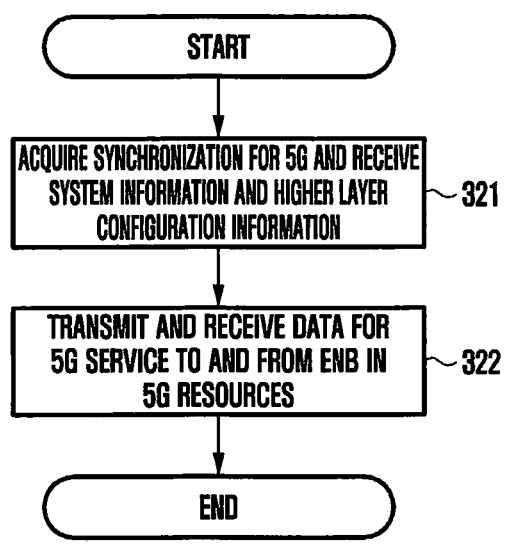

Subsequently, a procedure in which the 5G-capable terminal 303 receives the configuration of 5G resources from the eNB 301 and transmits and receives data through the 5G resources will be described with reference to FIG. 3C.

In step 321, the 5G-capable terminal 303 acquires synchronization from the synchronization signal for 5G transmitted by the eNB 301 and receives the system information and the higher configuration information transmitted by the eNB 301. With respect to the synchronization signal for 5G, separate synchronization signals may be transmitted for eMBB, mMTC, and URCCL using different numerologies, and a common synchronization signal may be transmitted through specific 5G resources using one numerology. With respect to the system information, common system information may be transmitted through specific 5G resources using one numerology, and separate system information may be transmitted for eMBB, mMTC, and URLLC using different numerologies. The system information and the higher configuration information may include configuration information indicating whether to use the slot or the mini-slot for data transmission and reception, the number of OFDM symbols of the slot or the mini-slot, and the numerology therefor. Further, if reception of a downlink common control channel is configured in the terminal, the system information and the higher configuration information may include configuration information related to reception of the downlink common control channel.

In step 322, the 5G-capable terminal 303 may transmit and receive data for the 5G service to and from the eNB 301 in 5G resources.

In the state in which the 5G system of FIG. 3 is operated by the slot or the mini-slot, uplink control channels such as a long PUCCH, a short PUCCH, or an SRS may coexist within one TTI or one slot. At this time, in order to prevent resource collision and maximize the resource use, a method of indicating a long PUCCH transmission interval (or a start symbol or an end symbol) and a method of transmitting a long PUCCH on the basis of the indication are described.

Figure 4:
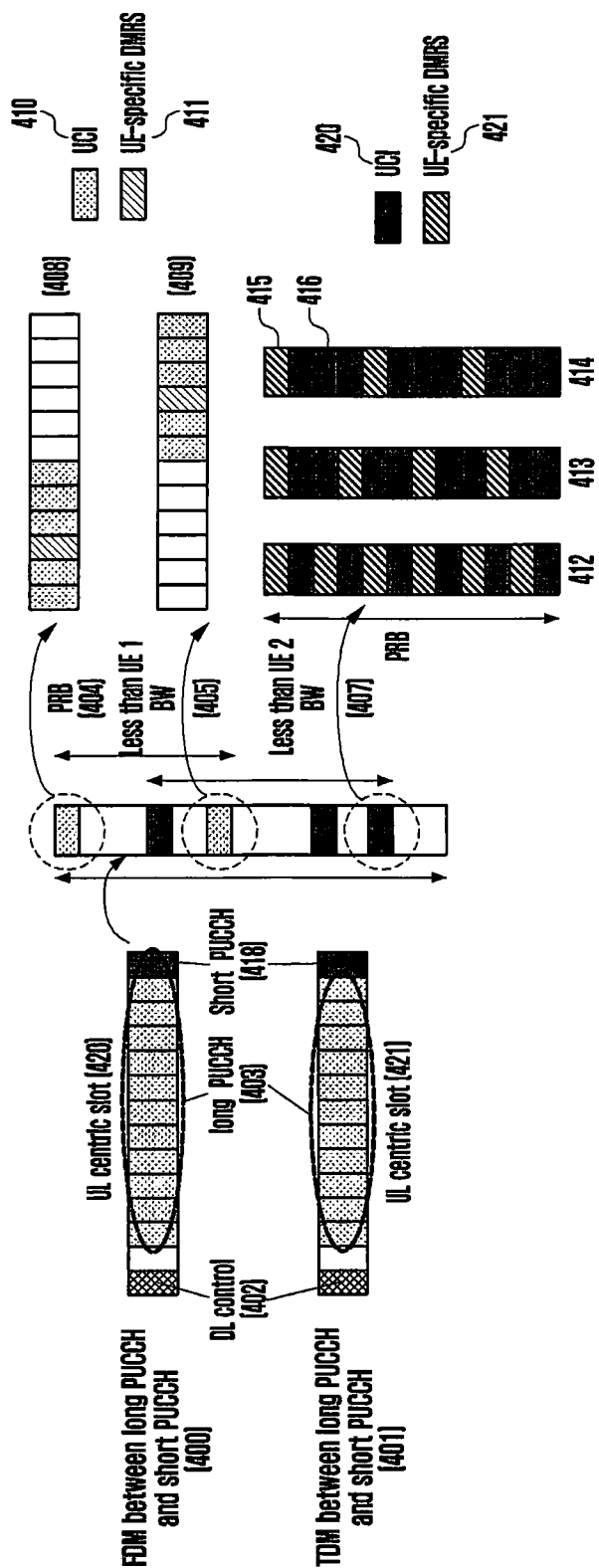
FIG. 4 illustrates a first embodiment of the disclosure.

First, FIG. 4 illustrates a first embodiment of the disclosure.

FIG. 4 illustrates a method by which the terminal determines the long PUCCH transmission interval (or the start symbol and the end symbol) on the basis of the slot and transmits an uplink control channel, but it should be noted that FIG. 4 may also be applied to the case in which the terminal determines the long PUCCH transmission interval (or the start symbol and the end symbol) on the basis of the mini-slot and transmits the uplink control channel.

FIG. 4 shows multiplexing of a long PUCCH and a short PUCCH in a frequency region (FDM 400) and multiplexing of a long PUCCH and a short PUCCH in a time region (TDM 401). First, a slot format in which the long PUCCH and the short PUCCH are multiplexed will be described with reference to FIG. 4. Reference numerals 420 and 421 indicate UL-centric slots in which uplink is mainly used in the slot (various names such as a subframe or a transmission time interval (TTI) may be used, but a slot which is a basic transmission unit is used in the disclosure) which is a basic transmission unit of 5G. In the UL-centric slot, most OFDM symbols are used for the uplink, and all OFDM symbols may be used for uplink transmission. Alternatively, in the UL-centric slot, some OFDM symbols may be used for downlink transmission, and if both the downlink and the uplink coexist in one slot, there may be a transmission gap therebetween. In FIG. 4, a first OFDM symbol in one slot may be used for downlink transmission, for example, downlink control channel transmission 402, and symbols from a third OFDM symbol may be used for uplink transmission. A second OFDM symbol is used for the transmission gap. In uplink transmission, uplink data channel transmission and uplink control channel transmission can be performed.

Subsequently, a long PUCCH 403 will be described. A control channel of a long transmission interval is used to increase cell coverage, and thus may be transmitted through a DFT-S-OFDM scheme for short carrier transmission rather than OFDM transmission. Accordingly, at this time, transmission should be performed using only consecutive subcarriers, and in order to obtain a frequency diversity effect, long transmission interval uplink control channels are configured at separated locations as indicated by reference numerals 408 and 409. A separated distance 405 in the frequency region should be smaller than the bandwidth supported by the terminal, and transmission is performed using PRB-1 in the front part of the slot as indicated by reference numeral 408 and transmission is performed using PRB-2 in the back part of the slot as indicated by reference numeral 409. The PRB is a physical resource block, which may be the minimum transmission unit in the frequency region, and may be defined by 12 subcarriers. Accordingly, the frequency distance between PRB-1 and PRB-2 should be smaller than the maximum bandwidth supported by the terminal, and the maximum bandwidth supported by the terminal may be equal to or smaller than the bandwidth 406 supported by the system. Frequency resources PRB-1 and PRB-2 may be configured in the terminal through a higher-layer signal and frequency resources may be mapped to a bit field through a higher-layer signal. The frequency resources to be used may be indicated to the terminal through the bit field included in the downlink control channel. Each of the control channel transmitted in the front part of the slot 408 and the control channel transmitted in the back part of the slot 409 may include uplink control information (UCI) 410 and a terminal reference signal 411, and it is assumed that the two signals are transmitted in different OFDM symbols in a time-division manner.

Subsequently, a short PUCCH 418 will be described. The short PUCCH may be transmitted through both the DL-centric slot and the UL-centric slot and may generally be transmitted through the last symbol of the slot or an OFDM symbol in the back (for example, the last OFDM symbol, the second-to-last OFDM symbol, or the last two OFDM symbols). Of course, the short PUCCH can be transmitted at a random location within the slot. The short PUCCH may be transmitted using one OFDM symbol or a plurality of OFDM symbols. In FIG. 4, the short PUCCH is transmitted in the last symbol 418 of the slot. Radio resources for the short PUCCH may be allocated in units of PRBs from the aspect of frequency, and a plurality of consecutive PRBs may be allocated, or a plurality of PRBs separated from each other in the frequency band may be allocated. The allocated PRBs should be included in a band equal to or smaller than the frequency band 407 supported by the terminal. The plurality of PRBs, which are the allocated frequency resources, may be configured in the terminal through a higher-layer signal, the frequency resources may be mapped to a bit field through the higher-layer signal, and the frequency resources to be used may be indicated to the terminal by the bit field included in the downlink control channel.

Uplink control information 420 and a demodulation reference signal 421 should be multiplexed within one PRB in the frequency band, and there may be a method of transmitting a demodulation reference signal to one subcarrier for every two symbols, as indicated by reference numeral 412, a method of transmitting a demodulation reference signal to one subcarrier for every three symbols, as indicated by reference numeral 413, or a method of transmitting a demodulation reference signal to one subcarrier for every four symbols, as indicated by reference numeral 414. Schemes to be used by the demodulation signal transmission methods 412, 413, and 414 may be configured through a higher signal. The terminal may multiplex and transmit a demodulation reference signal and uplink control information through a method indicated by reception of the higher layer signal. Alternatively, the method of transmitting the demodulation reference signal may be determined according to the number of bits of the uplink control information 420. If the number of bits of the uplink control information is small, the terminal may multiplex and transmit the uplink control information and the demodulation reference signal as indicated by reference numeral 412. When the number of bits of the uplink control information is small, a sufficient transmission code rate may be obtained even though many resources are not used for transmission of the uplink control information. If the number of bits of the uplink control information is large, the terminal may multiplex and transmit the uplink control information and the demodulation reference signal as indicated by reference numeral 414. If the number of bits of the uplink control information is large, it is required to use many resources for transmission of the uplink control information in order to reduce a transmission code rate.

Next, multiplexing of the long PUCCH and the short PUCCH will be described below. In one slot 420, long PDCCHs and short PDCCHs of different UEs may be multiplexed in the frequency region, as indicated by reference numeral 400. At this time, the eNB may configure frequency resources of the short PUCCH and the long PUCCH of different terminals so as to avoid overlapping each other, like the PRBs of FIG. 4. However, configuring transmission resources of the uplink control channels of all terminals differently wastes frequency resources regardless of whether scheduling is performed, and is inappropriate when it is considered that the limited frequency resources should be used for uplink data channel transmission rather than uplink control channel transmission. Accordingly, frequency resources of the short PUCCHs and the long PUCCHs of different terminals may overlap each other, in which case the eNB is required to perform scheduling and use transmission resources of different terminals so as to avoid collisions in one slot. However, if collisions between short PUCCH transmission resources and long PUCCH transmission resources of different terminals in a specific slot cannot be avoided, the eNB needs a method of preventing collisions between short PUCCH transmission resources and long PUCCH transmission resources, and the terminal needs a method of controlling long PUCCH transmission resources according to the indication of the eNB. The short PUCCH and long PUCCH transmission resources may be multiplexed in the time region within one slot 421 through the method as indicated by reference numeral 401.

The disclosure provides a method of transmitting the long PUCCH regardless of the number of uplink OFDM symbols in the slot format or the number of uplink OFDM symbols in one slot varying depending on transmission of the uplink control channel in a short time region such as the short PUCCH or the SRS. The method of the disclosure may be largely divided into three methods.

In a first method, if the eNB directly indicates long PUCCH transmission resources in one slot to the terminal through a first signal, the terminal may perform long PUCCH transmission in the transmission resources indicated in one slot through reception of the first signal. Alternatively, the eNB may implicitly (indirectly) indicate long PUCCH transmission resources to the terminal through definition in the standard for correlating the long PUCCH transmission resource with the number of uplink OFDM symbols or the number of GP OFDM symbols of the slot. The first signal may include a higher layer signal or a physical signal. The first signal may include the OFDM symbol interval (or the start OFDM symbol and the end OFDM symbol) in the time region and PRBs in the frequency region for transmission of the long PUCCH. If the terminal receives a third signal indicating transmission of the SRS or the short PUCCH of another terminal in specific OFDM symbols in one slot and the long PUCCH transmission having the OFDM symbol interval implicitly configured by the first signal is not possible, the terminal may drop the long PUCCH transmission. Alternatively, the terminal may determine how many long PUCCH transmission OFDM symbols overlap the SRS or short PUCCH transmission OFDM symbols. If the number of collided symbols is within a preset threshold, the terminal may transmit the long PUCCH which punctures the overlapping OFDM symbols. Otherwise, the terminal may drop the long PUCCH transmission. Alternatively, the terminal may always transmit the long PUCCH which punctures OFDM symbols that overlap the SRS or short PUCCH transmission OFDM symbols. The third signal and the threshold may be configured by a higher layer signal. Further, the threshold may be a constant corresponding to the number of specific OFDM symbols.

In a second method, if the eNB directly indicates long PUCCH transmission resources in one slot to the terminal through the first signal and a second signal, the terminal may perform long PUCCH transmission in the transmission resources indicated in one slot through reception of the first signal. The first signal may include a higher layer signal. The second signal may include a physical signal. The first signal may include available sets of the OFDM symbol interval (or the start OFDM symbol and the end OFDM symbol) in the time region and PRBs in the frequency region for transmission of the long PUCCH. The second signal may select and indicate one of the available sets.

In a third method, the eNB directly/indirectly indicates long PUCCH transmission resources in one slot to the terminal in advance through the first signal or definition in the standard for correlating the long PUCCH transmission resources with the number of uplink/downlink OFDM symbols and the number of GP OFDM symbols in the slot, and reduces or controls the long PUCCH transmission resources in one slot, indicated in advance through the second signal, in order to avoid a collision with uplink control channel transmission resources in a short time region. The terminal may determine in advance the long PUCCH transmission interval on the basis of reception of the first signal or the uplink/downlink OFDM symbols and the number of GP OFDM symbols in the slot. The terminal may perform long PUCCH transmission in one slot by controlling long PUCCH transmission resources in one slot through reception of the second signal. The first signal and the second signal may contain a higher signal, a physical signal, or a combination of a higher signal and a physical signal. The first signal may include the OFDM symbol interval (or the start OFDM symbol and the end OFDM symbol) in the time region and PRBs in the frequency region for transmission of the long PUCCH. The second signal may include the OFDM symbol interval (or the start OFDM symbol and the end OFDM symbol) in the time region and PRBs in the frequency region in which long PUCCH transmission cannot be performed in one slot.

The first method is suitable for uplink control channel transmission such as periodic channel information transmission configured in the terminal to be periodically transmitted without any scheduling grant. The second and third methods are suitable for uplink control channel transmission such as HARQ-ACK transmission configured in the terminal to be aperiodically transmitted by a scheduling grant. Accordingly, whether to apply the first method, the second method, or the third method is determined according to whether the uplink control channel transmitted by the terminal is triggered by the scheduling grant or transmitted uplink control information is periodic channel information or HARQ-ACK. For example, the first method may be applied to the uplink control channel transmission configured to be transmitted by the terminal without the scheduling grant, and the second method may be applied to the uplink control channel if transmission of the uplink control channel is triggered by the scheduling grant by the terminal. Alternatively, the terminal may apply the first method to uplink control channel transmission for transmitting periodic channel information and apply the second method or the third method to the uplink control channel for transmitting HARQ-ACK information. Alternatively, whether to apply the first method, the second method, or the third method may be configured in the terminal through a higher layer signal. If the terminal receives a configuration signal for always applying the first method to the uplink control signal through the higher layer signal, the terminal always applies the first method and transmits the uplink control channel. If the terminal receives a configuration signal for always applying the second method to the uplink control signal through the higher layer signal, the terminal always applies the second method and transmits the uplink control channel. When the terminal receives a configuration signal for always applying the third method to the uplink control channel through the higher layer signal, the terminal always applies the third method and transmits the uplink control channel.

The first method, the second method, and the third method will be described below in more detail.

In the first method, the eNB indicates an OFDM symbol interval (or a start OFDM symbol and an end OFDM symbol or OFDM symbols in which long PUCCH transmission should be avoided) for the long PUCCH transmission in the downlink control channel to the UE. The downlink control channel may be common information for group terminals or all terminals within the cell or may be dedicated information transmitted only to specific terminals. If long PUCCH transmission frequency resources of the terminal overlap short PUCCH transmission frequency resources of another terminal in the last OFDM symbol of the slot, the eNB may prevent the long PUCCH transmission interval from being the last OFDM symbol of the slot. For example, if the long PUCCH transmission interval supports OFDM symbols ranging from 4 OFDM symbols to 12 OFDM symbols (the uplink interval of the UL-centric slot 420 is 12 OFDM symbols), the eNB may indicate long PUCCH transmission in 11 OFDM symbols instead of long PUCCH transmission in 12 OFDM symbol through a bit field of the downlink control channel. The terminal may transmit the long PUCCH in 11 OFDM symbols. In another example, the long PUCCH transmission interval is configured as a set including at least one value of the limited symbol interval through a higher signal or defined according to a standard, for example, if transmission is performed only in 4, 6, 8, 10, and 12 OFDM symbols through a higher layer signal or defined according to the standard, the eNB may indicate long PUCCH transmission in 10 OFDM symbols through the bit field of the downlink control channel in order to avoid a collision with short PUCCH transmission resources in the last OFDM symbol. The terminal may transmit the long PUCCH in 10 OFDM symbols.

Alternatively, the eNB may indicate the short PUCCH transmission interval (or whether the interval is the last OFDM symbol, the second-last OFDM symbol, or the last two OFDM symbols) to the terminal, thereby avoiding a resource collision with the long PUCCH.

In the second method, the eNB configures an OFDM symbol interval (or a start OFDM symbol and an end OFDM symbol or OFDM symbols in which long PUCCH transmission should be avoided) for long PUCCH transmission to the terminal through a higher layer signal. Short PUCCH transmission frequency resources may be configured to have distributed PRBs or localized PRBs. If short PUCCH transmission frequency resources have distributed PRBs, there is a high probability of a collision with long PUCCH transmission frequency resources, so the eNB may prevent the long PUCCH transmission OFDM symbol interval from being OFDM symbols in which the short PUCCH is transmitted through a higher layer signal, that is, the last OFDM symbol. For example, the eNB may configure the long PUCCH transmission interval as 10 OFDM symbols in the terminal through a higher layer signal, and the terminal may perform long PUCCH transmission in 10 OFDM symbols.

In the third method, the eNB configures whether to perform long PUCCH transmission or short PUCCH transmission in the terminal through a higher layer signal or a physical downlink control signal and correlates the OFDM symbol interval for long POUCCH transmission with the number of uplink OFDM symbols according to a slot format. However, the eNB may provide information on whether long PUCCH transmission can be performed in the last one or two OFDM symbols to the terminal. The terminal may receive the configuration information and determine whether to transmit the long PUCCH or the short PUCCH. If the terminal receives the indication information and performs long PUCCH transmission, the terminal may determine information on whether the long PUCCH transmission can be performed in the last one or two OFDM symbols. For example, if it is assumed that the uplink OFDM symbol interval corresponds to 11 OFDM symbols in the slot, the terminal may determine that the long PUCCH transmission is performed in the 11 OFDM symbols on the basis of the uplink OFDM symbol interval of the slot. The terminal may receive the indication information and determine whether to perform the long PUCCH transmission in 11 OFDM symbols, in 10 OFDM symbols, or 9 OFDM symbols. If the long PUCCH is transmitted in 10 OFDM symbol or 9 OFDM symbols, the long PUCCH symbols may be punctured or rate-matched from the back on the basis of the long PUCCH transmission in 11 OFDM symbols. Information on the uplink OFDM symbol interval of the slot may be received by the terminal from the downlink control channel, and the downlink control channel may be common information to group terminals or all terminals in the cell, or may be dedicated information transmitted only to specific terminals.

Figure 5A:
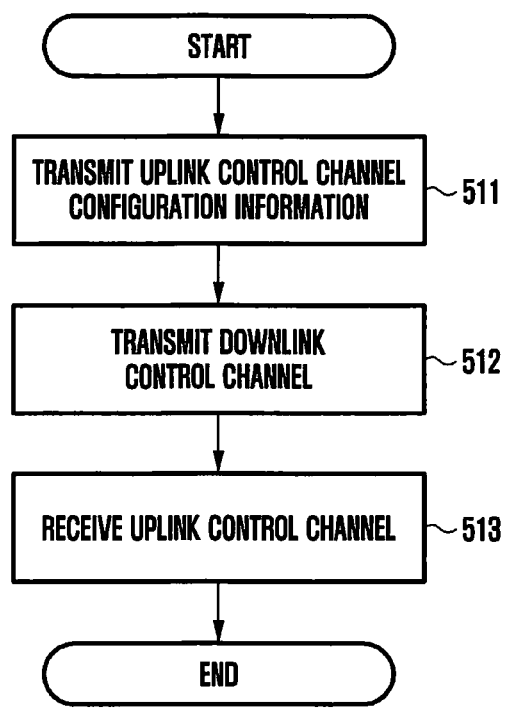
FIGS. 5A and 5B illustrate eNB and terminal procedures according to the first embodiment of the disclosure.
Figure 5B:
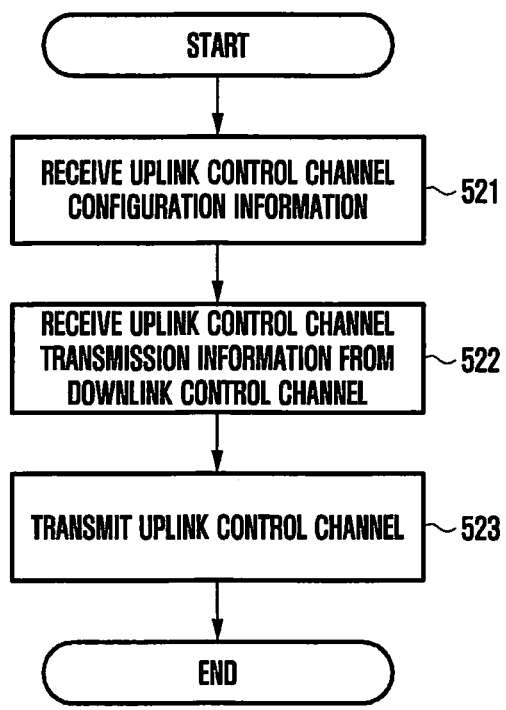

FIGS. 5A and 5B illustrate eNB and terminal procedures according to the first embodiment of the disclosure.

First, the eNB procedure will be described with reference to FIG. 5A.

In step 511, the eNB may transmit uplink control channel configuration information to the terminal. The uplink control channel configuration information may include an available set including the long PUCCH or short PUCCH frequency PRB resources or at least one value of the OFDM symbol interval as described with reference to FIG. 4. In order to avoid a short PUCCH or long PUCCH transmission resource collision between terminals, the eNB may transmit the uplink control channel configuration information to the terminal through a higher layer signal.

In step 512, the eNB may transmit a downlink control channel to the terminal. The downlink control channel may include a bit field indicating the short PUCCH or long PUCCH frequency PRBs, the time OFDM symbol interval, the start OFDM symbol and the end OFDM symbol, or the OFDM symbols in which long PUCCH transmission should be avoided as described with reference to FIG. 4. In order to avoid a short PUCCH or long PUCCH transmission resource collision between terminals, the eNB may transmit the downlink control channel configuration information to the terminal. The downlink control channel may be common information for group terminals or all terminals within the cell or may be dedicated information transmitted only to specific terminals.

In step 513, the eNB may receive an uplink control channel from the terminal in the short PUCCH or long PUCCH transmission time through frequency resources indicated in step 511 or 512.

Next, the terminal procedure will be described with reference to FIG. 5B.

In step 521, the terminal may receive uplink control channel configuration information from the eNB. The uplink control channel configuration information may include an available set including the long PUCCH or short PUCCH frequency PRB resources or at least one value of the time OFDM symbol interval as described with reference to FIG. 4, and the terminal may receive the information from the eNB through a higher signal in order to avoid a short PUCCH or long PUCCH transmission resource collision between terminals.

In step 522, the terminal may receive a downlink control channel from the eNB. The downlink control channel may include a bit field indicating the short PUCCH or long PUCCH frequency PRBs, the time OFDM symbol interval, the start OFDM symbol and the end OFDM symbol, or the OFDM symbols in which the long PUCCH transmission should be avoided, as described with reference to FIG. 4, and the information may be received in order to avoid short PUCCH or long PUCCH transmission resource collision between terminals. The downlink control channel may be common information for group terminals or all terminals within the cell or may be dedicated information transmitted only to specific terminals.

In step 523, the terminal may transmit the uplink control channel to the eNB in the short PUCCH or long PUCCH transmission time and frequency resources received in step 521 or 522.

Figure 6:
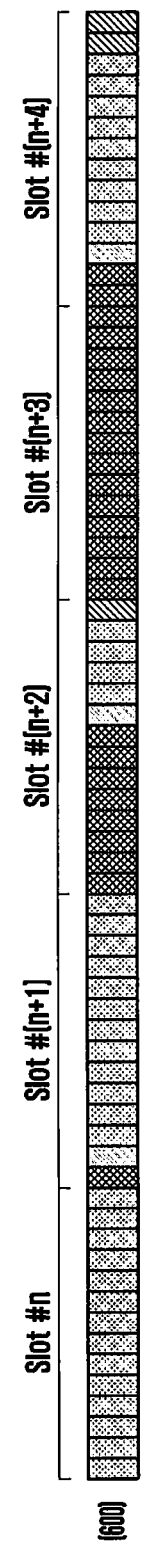
FIG. 6 illustrates a second embodiment of the disclosure.

FIG. 6 illustrates a second embodiment of the disclosure.

FIG. 6 describes a method by which the terminal receives an OFDM symbol interval of the long PUCCH of the uplink control channel (or start OFDM symbol and end symbol locations or OFDM symbols in which the long PUCCH is not transmitted) on the basis of the slot having 14 OFDM symbols and transmits the uplink control channel. However, it may be noted that the method can be applied to the case in which the terminal receives an OFDM symbol interval (or the start OFDM symbol location and end symbol location, or OFDM symbols in which the long PUCCH is not transmitted) of the long PUCCH of the uplink control channel on the basis of the mini-slot and transmits the uplink control channel.

As described above, 5G supports various slot formats, for example, the DL-only slot, the DL-centric slot, the UL-only slot, and the UL-centric slot. In each slot format, a downlink period, a GP, and an uplink period may be configured by various OFDM symbols. The slot format and the format structure (the number of OFDM symbols of the downlink period, the GP, and the uplink period) may be received by the terminal through a higher layer signal or an L1 signal.

In order to improve coverage of the terminal, slot aggregation may be configured in the terminal through a higher layer signal, or may be indicated by an L1 signal. The terminal in which slot aggregation is configured or for which slot aggregation is indicated and which is configured or indicated to transmit the long PUCCH transmits the long PUCCH through a plurality of slots.

Like the slot format illustrated in FIG. 6, the plurality of slots may have various slot formats. If slot aggregation over N slots is configured in or indicated to the terminal, the long PUCCH may not be transmitted or the number of uplink OFDM symbols for transmitting the long PUCCH may vary depending on a slot format of the N slots or a format structure. It is assumed that slot #n is a UL-only slot in which the long PUCCH can be transmitted through 14 OFDM symbols, slot # (n+1) is a UL-centric slot in which the long PUCCH can be transmitted through 12 OFDM symbols, and slot # (n+2) is a DL-centric slot in which the long PUCCH can be transmitted through 5 OFDM symbols, but SRS transmission resources collide with long PUCCH transmission resources in the last symbol, and thus the long PUCCH can be actually transmitted through 4 OFDM symbols in FIG. 6. Slot #(n+3) is a DL-only slot and thus cannot transmit the long PUCCH. It is assumed that slot # (n+4) is a UL-centric slot in which the long PUCCH can be transmitted through 11 OFDM symbols but short PUCCH transmission resources collide with long PUCCH transmission resources in the last two OFDM symbols, and thus the long PUCCH can be transmitted through 9 OFDM symbols.

A method of configuring slot aggregation and a method by which the terminal transmits the long PUCCH according to the configured slot aggregation will be described with reference to FIG. 6.

In the disclosure, a first method of supporting slot aggregation configures how many slots are used for long PUCCH transmission. Alternatively, how many times the long PUCCH of one slot is repeatedly transmitted in a plurality of slots may be configured. The number of slots belonging to slot aggregation or the number of repetitive transmissions in a plurality of slots on the assumption that long PUCCH transmission in one slot is one transmission may be configured in or indicated to the terminal by a higher layer signal or an L1 signal. The terminal may count the number of long PUCCH transmissions according to the slot aggregation configuration. If the counted number of repetitive long PUCCH transmissions is the same as long PUCCH transmissions included in the slot aggregation configuration information, the terminal may stop the repetitive long PUCCH transmission. Two methods by which the terminal counts the number of long PUCCH transmissions will be described.

In a first method, if 4 symbols, which correspond to the minimum number of symbols for long PUCCH transmission in one slot, or more can be transmitted, the terminal may count long PUCCH transmissions. If 4 long PUCCH transmissions, which correspond to long PUCCH transmissions included in the slot aggregation configuration information, are configured or transmission of a first long PUCCH in slot #n is indicated as HARQ-ACK for a specific PDSCH or configured or scheduled CQI transmission through a downlink control channel or a higher layer signal in FIG. 6, long PUCCH transmissions in slot #(n+1), slot #(n+2), and slot #(n+4) may be continuously performed and then the number of transmissions may be counted each time. Since 4 long PUCCH transmissions are satisfied after long PUCCH transmission in slot #(n+4), the terminal may not perform long PUCCH transmission after slot #(n+4) as HARQ-ACK or CQI transmission.

In a second method, the terminal may count long PUCCH transmissions only for long PUCCH transmissions performed through K symbols or more in one slot. K may be configured through a higher layer signal or a physical signal. If K is configured as 7 symbols and 3 long PUCCH transmissions, which correspond to long PUCCH transmissions included in the slot aggregation configuration information, are configured or transmission of the first long PUCCH in slot #n is indicated as HARQ-ACK for a specific PDSCH or configured or scheduled CQI transmission through a downlink control channel or a higher layer signal in FIG. 6, the terminal may continuously perform long PUCCH transmissions in slot #(n+1) and slot #(n+4) and then count the number of transmissions each time. However, since 3 long PUCCH transmissions through 7 symbols or more are satisfied after long PUCCH transmission in slot #(n+4), the terminal may not perform long PUCCH transmission after slot #(n+4) as HARQ-ACK or CQI transmission. Since only long PUCCH transmission through 4 symbols in slot #(N+2) can be performed, the long PUCCH in slot #(n+2) can be transmitted or not by the terminal, but long PUCCH transmission in slot #(n+2) is not counted as transmission for slot aggregation.

Subsequently, a second method of supporting slot aggregation in the disclosure configures how many uplink OFDM symbols are used for long PUCCH transmission over a plurality of slots. The number of uplink OFDM symbol transmissions for which slot aggregation is performed may be configured in or indicated to the terminal by a higher signal or an L1 signal. When transmitting the long PUCCH according to the slot aggregation configuration, the terminal may count the number of uplink OFDM symbols over a plurality of slots. If the counted number of uplink OFDM symbols is the same as the number of uplink OFDM symbols included in the slot aggregation configuration information, the terminal may stop the repetitive long PUCCH transmission. Two methods by which the terminal counts the number of uplink OFDM symbols in the long PUCCH transmission will be described.

In a first method, if 4 symbols, which correspond to the minimum number of symbols for long PUCCH transmission in one slot, or more can be transmitted, the terminal may count the number of uplink OFDM symbols for long PUCCH transmission. FIG. 6 illustrates an example of the case in which the number of uplink OFDM symbols for long PUCCH transmission included in the slot aggregation configuration information is 34 and transmission of the first long PUCCH in slot #n is indicated by a downlink control channel or a higher layer signal as HARQ-ACK for a specific PDSCH or configured or scheduled CQI transmission. At this time, the number of uplink OFDM symbols after transmission in slot #n is 14, the accumulated number of uplink OFDM symbols after long PUCCH transmission in slot #(n+1) is 26, the accumulated number of uplink OFDM symbols after long PUCCH transmission in slot #(n+2) is 30, and the accumulated number of uplink OFDM symbols after long PUCCH transmission in slot #(n+4) is 39, and thus long PUCCH transmission in 34 uplink OFDM symbols is satisfied after long PUCCH transmission in slot #(n+4), and accordingly the terminal may not perform long PUCCH transmission after slot #(n+4) as the HARQ-ACK or the CQI transmission.

In a second method, the terminal may count the number of OFDM symbols for long PUCCH transmission only for long PUCCH transmission performed through K symbols or more in one slot. K may be configured through a higher layer signal or a physical signal. FIG. 6 illustrates an example of the case in which, if K is configured as 7 symbols, the number of uplink OFDM symbols for long PUCCH transmission included in the slot aggregation configuration information is 30 and transmission of the first long PUCCH in slot #n is indicated by a downlink control channel or a higher layer signal as HARQ-ACK for a specific PDSCH or configured or scheduled CQI transmission. At this time, since the number of uplink OFDM symbols after transmission in slot #n is 14, the accumulated number of uplink OFDM symbols after long PUCCH transmission in slot #(n+1) is 26, and the number of long PUCCH uplink OFDM symbols which can be transmitted in slot #(n+2) is 4, the terminal may not count the long PUCCH uplink OFDM symbols. Continuously, the accumulated number of uplink OFDM symbols after long PUCCH transmission in slot #(n+4) is 35 and thus long PUCCH transmission in 30 uplink OFDM symbols is satisfied after long PUCCH transmission in slot #(n+4), and accordingly the terminal may not perform long PUCCH transmission after slot #(n+4) as the HARQ-ACK or the CQI transmission. Since only long PUCCH transmission performed through 4 symbols in slot #(n+2) can be performed, the terminal may transmit the long PUCCH in slot #(n+2) or not, but the number of uplink OFDM symbols for long PUCCH transmission in slot #(n+2) may not counted as transmission for slot aggregation.

In the first and second methods of supporting slot aggregation as another terminal operation for slot aggregation, the terminal may continuously perform slot aggregation without stopping the same even though a downlink slot exists during slots for slot aggregation. On the other hand, different terminal operation may be performed in the case in which the terminal receives dynamic signaling and operates in TDD and the case in which the terminal receives semi-static signaling and operates in TDD. In other words, if slot aggregation is performed and slots in TDD are determined through semi-static signaling, the terminal may continuously perform long PUCCH transmission until the slot aggregation configuration is satisfied as in the first and second methods without stopping slot aggregation even though a downlink slot exists during slots. However, if slot aggregation is performed and slots in TDD are determined through dynamic signaling, the terminal may determine that the eNB intentionally operates a slot that makes slot aggregation not performed anymore and thus the terminal may stop slot aggregation and may not perform long PUCCH transmission anymore if a downlink slot exists during slots.

In another terminal operation for slot aggregation, the case in which the eNB configures the slot aggregation in the terminal as in the first and second methods and then transmission of the first long PUCCH in slot #n is indicated as HARQ-ACK for a specific PDSCH or configured or scheduled CQI transmission through a downlink control channel or a higher layer signal is described as an example. At this time, after transmission of the long PUCCH in slot #n, if the eNB succeeds in decoding of the long PUCCH even though long PUCCH transmission does not end as configured by slot aggregation, the eNB may schedule a new PDCCH/PDSCH or schedule transmission of new CQI. Accordingly, the terminal may be required to monitor the new PDCCH, receive the new PDSCH, and transmit the long PUCCH. If transmission of new CQI is scheduled, even when the previous long PUCCH transmission operation is not finished as configured by slot aggregation, the terminal may stop the long PUCCH transmission operation and may start long PUCCH transmission for the new PDSCH or long PUCCH transmission for the new CQI as configured by slot aggregation.

In another terminal operation for slot aggregation, if the eNB configures the slot aggregation in the terminal as in the first and second methods, the eNB may configure the slot aggregation including a first value and a second value in each of the methods in the terminal through a higher layer signal. In other words, the first and second values may be first and second values for repetitive long PUCCH transmission in the first method and may be first and second values for the number of uplink OFDM symbols for long PUCCH transmission in the second method. The terminal may receive the first value and the second value included in the slot aggregation configuration information, perform long PUCCH transmission as configured in slot aggregation before the first value is satisfied in each method, and may not perform other PDCCH monitoring, other PDSCH reception, and other PUCCH transmission. Before the second value is satisfied after the first value is satisfied, the eNB may schedule a new PDSCH even though long PUCCH transmission configured in slot aggregation is not finished. Alternatively, if the eNB schedules transmission of new CQI, the terminal may be required to receive a new PDSCH and transmit the long PUCCH. Alternatively, if transmission of new CQI is scheduled, even when the previous long PUCCH transmission operation is not finished as configured by slot aggregation, the terminal may stop the long PUCCH transmission operation and may start long PUCCH transmission for the new PDSCH or long PUCCH transmission for the new CQI as configured by slot aggregation.

In another terminal operation for slot aggregation, if the eNB configures the slot aggregation in the terminal, the terminal may transmit the first long PUCCH in PUCCH transmission resources implicitly or explicitly determined by PUCCH transmission resources. The terminal may transmit the remaining long PUCCHs configured by the slot aggregation in PUCCH transmission resources configured by a higher layer signal.

In another terminal operation for slot aggregation, if the eNB configures the slot aggregation in the terminal, the terminal may start first long PUCCH transmission when there is no transmission of HARQ-ACK for a previous PDSCH transmitted by slot aggregation or previously scheduled or there is no PUCCH transmission or PUSCH transmission for previously scheduled or configured CQI transmission.

Figure 7:
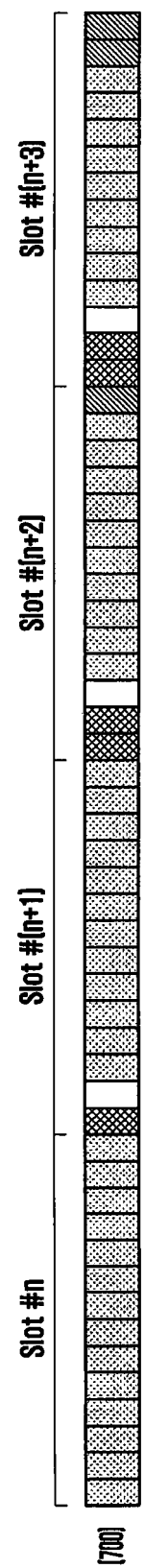
FIG. 7 illustrates a third embodiment of the disclosure.

Next, a third embodiment in which the terminal transmits the long PUCCH in every slot when slot aggregation is configured as shown in FIG. 6 will be provided through FIG. 7.

Like the slot format illustrated in FIG. 7, the plurality of slots may have various slot formats. If slot aggregation performed over four slots is configured in or indicated to the terminal, the number of uplink OFDM symbols through which the long PUCCH can be transmitted may vary depending on the slot format of the four slots or the format structure. In FIG. 7, slot #n is a UL-only slot in which the long PUCCH can be transmitted in 14 OFDM symbols. Slot #(n+1) is a UL-centric slot in which the long PUCCH can be transmitted in 12 OFDM symbols. It is assumed that slot #(n+2) is a UL-centric slot in which the long PUCCH can be transmitted through 11 OFDM symbols but short PUCCH transmission resources collide with long PUCCH transmission resources in the last symbol, and thus the long PUCCH can be transmitted through 10 OFDM symbols. It is assumed that slot #(n+3) is a UL-centric slot in which the long PUCCH can be transmitted through 11 OFDM symbols but transmission resources of the short PUCCH and the SRS collide with transmission resources of the long PUCCH in the last two OFDM symbols, and thus the long PUCCH can be transmitted through 9 OFDM symbols. At this time, in order to avoid a collision with uplink control channel transmission resources in a short time region, such as the short PUCCH or the SRS, a method by which long PUCCH transmission resources are indicated to the terminal is provided.

The method according to the third embodiment of the disclosure may be largely divided into three methods. In a first method, in order to avoid a collision between long PUCCH transmission resources and uplink control channel transmission resources in the short time region in a plurality of slots belonging to slot aggregation by a third signal, the eNB may directly indicate the long PUCCH transmission resources to the terminal through a first signal. Alternatively, the eNB may implicitly (indirectly) indicate the long PUCCH transmission resources to the terminal through definition in the standard for correlating the long PUCCH transmission resources with the number of uplink OFDM symbols or the number of GP OFDM symbols of the slot. The terminal may determine the plurality of slots to which slot aggregation is applied through the third signal and perform long PUCCH transmission in the transmission resources indicated by the plurality of slots through reception of the first signal or the implicit method. The first signal or the third signal may be configured by a higher signal, a physical signal, or a combination of the higher signal and the physical signal. The first signal may include an OFDM symbol interval (or a start OFDM symbol and an end OFDM symbol) in the time region and PRBs in the frequency region for transmission of the long PUCCH corresponding to the number of slots applied to slot aggregation in order to apply the same to each slot of a plurality of slots to which the slot aggregation is applied. Alternatively, the first signal may include an OFDM symbol interval (or a start OFDM symbol and an end OFDM symbol) in the time region and PRBs in the frequency region for transmission of the long PUCCH to be applied to a plurality of slots to which the slot aggregation is applied in common. The third signal may include relevant information for performing slot aggregation, such as information on the number of slots to which slot aggregation is applied or the number of uplink OFDM symbols and information on indexes of the slots to which slot aggregation is applied.

In a second method, in order to avoid a collision between long PUCCH transmission resources and uplink control channel transmission resources in the short time region in a plurality of slots belonging to slot aggregation by a third signal, the eNB may directly indicate the long PUCCH transmission resources to the terminal through a first signal and a second signal. The terminal may perform long PUCCH transmission in transmission resources in one slot indicated by reception of the first signal and the second signal. The first signal may include a higher layer signal and the second signal may include a physical signal. The first signal may include available sets of the OFDM symbol interval (or the start OFDM symbol and the end OFDM symbol) in the time region and PRBs in the frequency region for transmitting the long PUCCH, and the second signal may select and indicate one of the available sets. The third signal may include relevant information for performing slot aggregation, such as information on the number of slots to which slot aggregation is applied or the number of uplink OFDM symbols and information on indexes of the slots to which slot aggregation is applied.

In a third method, the eNB may directly/indirectly indicate in advance long PUCCH transmission resources in one slot to the terminal through the first signal or through definition in the standard for correlating the long PUCCH transmission resources with the number of uplink OFDM symbols and the number of GP OFDM symbols of the slot. The eNB may reduce or control the long PUCCH transmission resources indicated in advance through the second signal in a plurality of slots belonging to slot aggregation in order to avoid the collision with the uplink control channel transmission resources in the short time region in a plurality of slots belonging to slot aggregation through the third signal. The terminal may determine in advance the long PUCCH transmission interval on the basis of reception of the first signal or the uplink/downlink OFDM symbols and the number of GP OFDM symbols in the slot. Further, the terminal may determine a plurality of slots to which slot aggregation is applied through the third signal. The terminal may perform long PUCCH transmission by controlling the long PUCCH transmission resources in a plurality of slots through reception of the second signal. The first signal, the second signal, and the third signal may be configured by a higher signal, a physical signal, or a combination of the higher signal and the physical signal. The first signal includes the OFDM symbol interval (or the start OFDM symbol and the end OFDM symbol) in the time region and PRBs in the frequency region for transmission of the long PUCCH. The second signal may include an OFDM symbol interval (or a start OFDM symbol and an end OFDM symbol) in the time region and PRBs in the frequency region, in which the long PUCCH cannot be transmitted, corresponding to the number of slots to which slot aggregation is applied in order to apply the same to each slot of a plurality of slots to which the slot aggregation is applied. Alternatively, the second signal may include an OFDM symbol interval (or a start OFDM symbol and an end OFDM symbol) in the time region and PRBs in the frequency region, in which the long PUCCH cannot be transmitted, in order to apply the same to a plurality of slots to which the slot aggregation is applied in common. The third signal may include relevant information for performing slot aggregation, such as information on the number of slots to which slot aggregation is applied or the number of uplink OFDM symbols and information on indexes of the slots to which slot aggregation is applied.

The first method may be suitable for uplink control channel transmission such as periodic channel information transmission configured in the terminal for period transmission without a scheduling grant, and the second and third methods may be suitable for uplink control channel transmission such as HARQ-ACK transmission configured in the terminal for aperiodic transmission with a scheduling grant. Accordingly, the first method and the second method/the third method may be applied according to whether the uplink control channel transmitted by the terminal is triggered by the scheduling grant or transmitted uplink control information is periodic channel information or HARQ-ACK. For example, the first method may be applied to the uplink control channel transmission configured to be transmitted by the terminal without the scheduling grant, and the second method/the third method may be applied to the uplink control channel if transmission of the uplink control channel is triggered by the scheduling grant by the terminal. Alternatively, the terminal may apply the first method to uplink control channel transmission for transmitting periodic channel information and apply the second method/the third method to the uplink control channel for transmitting HARQ-ACK information. Alternatively, whether to apply the first method or the second method/the third method may be configured in the terminal through a higher layer signal. If the terminal receives a configuration signal for always applying the first method to the uplink control channel through the higher layer signal, the terminal may always apply the first method and transmit the uplink control channel. If the terminal receives a configuration signal for always applying the second method to the uplink control channel through the higher layer signal, the terminal may always apply the second method and transmit the uplink control channel. If the terminal receives a configuration signal for always applying the third method to the uplink control channel through the higher layer signal, the terminal may always apply the third method and transmit the uplink control channel.

The first method and the second method will be described below in more detail.

In the first method, if slot aggregation is configured by a higher layer signal or in the downlink control channel indicating slot aggregation, the eNB indicates an available max. OFDM symbol interval (for example, a start OFDM symbol and an end OFDM symbol or whether the OFDM symbol in which long PUCCH transmission should be avoided is the last one symbol or the last two OFDM symbols) for long PUCCH transmission to the terminal through the higher signal or the downlink control channel. The downlink control channel may be common information for group terminals or all terminals within the cell or may be dedicated information transmitted only to specific terminals. In the above example, the eNB may configure the long PUCCH transmission interval as the max. OFDM symbols in which long PUCCH transmission can be performed among 14 OFDM symbols available in slot #n, 12 OFDM symbols available in slot #(n+1), 10 OFDM symbols available in slot #(n+2), and 9 OFDM symbols available in slot #(n+3). For example, if the long PUCCH transmission interval supports OFDM symbols ranging from 4 OFDM symbols to 12 OFDM symbols, the eNB may indicate long PUCCH transmission in 9 OFDM symbols through a bit field of the downlink control channel. The terminal may transmit the long PUCCH in 9 OFDM symbols in each of four slots from slot #n to slot #(n+3). In another example, if the long PUCCH transmission interval is configured as a set of the limited symbol intervals through a higher signal or defined according to a standard, for example, if transmission only in 4, 6, 8, 10, and 12 OFDM symbols is configured through a higher signal or defined according to a standard, the eNB may indicate long PUCCH transmission in 8 OFDM symbols through a bit field of the downlink control channel in order to avoid a collision with short PUCCH or SRS transmission resources in all slots belonging to slot aggregation. The terminal may transmit the long PUCCH in 8 OFDM symbols.

In the second method, if slot aggregation is configured through a higher layer signal or in the downlink control channel indicating slot aggregation, the eNB may indicate in advance the OFDM symbol interval (or a start OFDM symbol and an end OFDM symbol, or whether the OFDM symbol in which long PUCCH transmission should be avoided is the last one OFDM symbol or the last two OFDM symbols) for all slots belonging to slot aggregation to the terminal. The downlink control channel may be common information for group terminals or all terminals within the cell or may be dedicated information transmitted only to specific terminals. In the above example, the eNB may configure the long PUCCH transmission interval corresponding to 11 symbols in the terminal through a higher layer signal. The eNB may indicate 14 OFDM symbols transmittable in slot #n, 12 OFDM symbols transmittable in slot #(n+1), 10 OFDM symbols transmittable in slot #(n+2), and 9 OFDM symbols transmittable in slot #(n+3) through a downlink control channel. For example, if the long PUCCH transmission interval supports OFDM symbols ranging from 4 OFDM symbols to 12 OFDM symbols, the eNB may configure long PUCCH transmission in 11 OFDM symbols through a higher layer signal. The eNB may indicate whether long PUCCH transmission can be performed in the last OFDM symbol or the last two OFDM symbols in four slots from slot #n to slot #(n+3) through a downlink control channel. The terminal may receive the configuration information and indication information and transmit the long PUCCH in 11, 11, 10, and 9 OFDM symbols in the four slots from slot #n to slot #(n+3), respectively.

In another example, if the long PUCCH transmission interval is configured as a set of the limited symbol intervals through a higher layer signal or defined according to a standard, for example, if transmission only in 4, 6, 8, 10, and 12 OFDM symbols is configured through a higher layer signal or defined according to a standard, the eNB may indicate long PUCCH transmission in 10 OFDM symbols through a higher layer signal in order to avoid a collision with short PUCCH or SRS transmission resources in all slots belonging to slot aggregation. The eNB may indicate whether long PUCCH transmission can be performed in the last OFDM symbol or the last two OFDM symbols in four slots from slot #n to slot #(n+3) through a downlink control channel. The terminal may receive the configuration information and indication information and transmit the long PUCCH in 10, 10, 10, and 8 OFDM symbols in the four slots from slot #n to slot #(n+3), respectively.

In the third method, the eNB configures an OFDM symbol interval (or a start OFDM symbol and an end OFDM symbol or OFDM symbols in which long PUCCH transmission should be avoided) for long PUCCH transmission in the terminal through a higher layer signal. Short PUCCH transmission frequency resources may be configured to have distributed PRBs or localized PRBs. If short PUCCH transmission frequency resources have distributed PRBs, there is a high probability of a collision with long PUCCH transmission frequency resources, so the eNB may prevent the long PUCCH transmission OFDM symbol interval from being OFDM symbols in which the short PUCCH is transmitted through a higher layer signal, that is, the last OFDM symbol. For example, transmission of the long PUCCH transmission interval in 8 OFDM symbols may be configured in the terminal through a higher layer signal. If performance of slot aggregation is configured, the terminal may perform long PUCCH transmission in 8 OFDM symbols in all slots belonging to slot aggregation.

In the fourth method, the eNB may configure whether to perform long PUCCH transmission or short PUCCH transmission in the terminal through a higher layer signal or a physical downlink control signal and correlate the OFDM symbol interval for long PUCCH transmission with the number of uplink OFDM symbols according to a slot format. At this time, the BS indicates information on whether long PUCCH transmission can be performed in the last one or two OFDM symbols in each or all of the slots belonging to slot aggregation to the terminal through the higher signal or the physical signal. The terminal may receive the configuration information and determine whether to transmit the long PUCCH or the short PUCCH. If the terminal receives the indication information and performs long PUCCH transmission, the terminal may determine information on whether the long PUCCH transmission can be performed in the last one or two OFDM symbols in all slot belonging to slot aggregation. In the indication information, one bit field may be applied to all slots belonging to slot aggregation, or each bit field may be applied to each slot. If one bit field is applied to all slots belonging to slot aggregation and long PUCCH transmission cannot be performed in the last one OFDM symbols, based on the assumption that the uplink OFDM symbol interval is 14, 12, 11, and 9 OFDM symbols in all slots belonging to slot aggregation, the terminal may determine that the long PUCCH transmission is performed in 14, 12, 11, and 9 OFDM symbol interval on the basis of the uplink OFDM symbol intervals in the slots, receive the indication information, and perform the long PUCCH transmission in 13, 11, 10, and 8 OFDM symbols in every slot. If the long PUCCH transmission is performed in 13, 11, 10, and 8 OFDM symbols, the long PUCCH symbols may be punctured or rate-matched from the back on the basis of the long PUCCH transmission in 14 OFDM symbols. Information on the uplink OFDM symbol interval of the slot may be received by the terminal from the downlink control channel, and the downlink control channel may be common information to group terminals or all terminals in the cell, or may be dedicated information transmitted only to specific terminals.

Figure 8A:
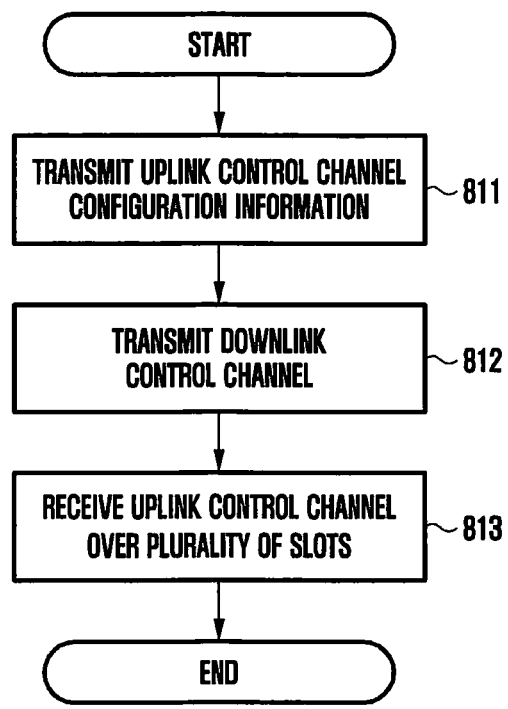
FIGS. 8A and 8B illustrate eNB and terminal procedures according to the third embodiment of the disclosure.
Figure 8B:
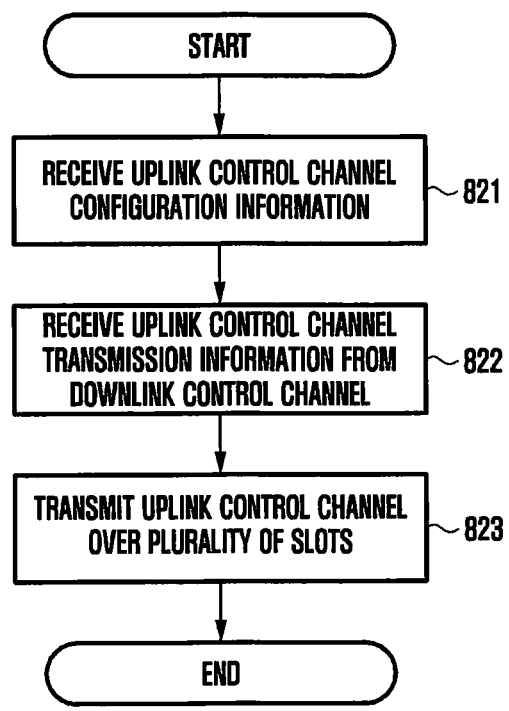

FIGS. 8A and 8B illustrate eNB and terminal procedures according to the third embodiment of the disclosure.

First, the eNB procedure will be described with reference to FIG. 8A.

In step 811, the eNB may transmit uplink control channel configuration information to the terminal. The uplink control channel configuration information may include an available set including at least one of the long PUCCH or short PUCCH frequency PRB resources or the time OFDM symbol interval, information required for slot aggregation (the number of slots belonging to slot aggregation or the number of uplink OFDM symbols), or a max. time OFDM symbol interval for transmitting the long PUCCH in a plurality of slots belonging to slot aggregation as described with reference to FIG. 4 or 7. In order to avoid a short PUCCH or long PUCCH transmission resource collision between terminals, the eNB may transmit the uplink control channel configuration information to the terminal through a higher layer signal.

In step 812, the eNB may transmit a downlink control channel to the terminal. The downlink control channel may include the short PUCCH or long PUCCH frequency PRBs, the time OFDM symbol interval, the start OFDM symbol and the end OFDM symbol, the bit field indicating the OFDM symbol in which transmission of the long PUCCH is avoided, information required for slot aggregation (the number of slots belonging to slot aggregation or the number of uplink OFDM symbols), and the available max. time OFDM symbol interval for transmitting the long PUCCH in a plurality of slots belonging to slot aggregation, as described with reference to FIG. 4 or 7, and the eNB may transmit the downlink control channel to the terminal in order to avoid a short PUCCH or long PUCCH transmission resource collision between terminals. The downlink control channel may be common information for group terminals or all terminals within the cell or may be dedicated information transmitted only to specific terminals.

In step 813, the eNB may receive an uplink control channel from the terminal in short PUCCH or long PUCCH transmission time and frequency resources indicated in step 811 or 812 over a plurality of slots.

Next, the terminal procedure will be described with reference to FIG. 8B.

In step 821, the terminal may receive uplink control channel configuration information from the eNB. The uplink control channel configuration information may include an available set including at least one of the long PUCCH or short PUCCH frequency PRB resources or the time OFDM symbol interval, information required for slot aggregation (the number of slots belonging to slot aggregation or the number of uplink OFDM symbols), or a max. time OFDM symbol interval for transmitting the long PUCCH in a plurality of slots belonging to slot aggregation, as described with reference to FIG. 4 or FIG. 7, and the terminal may receive the uplink control channel configuration information from the eNB through a higher signal in order to avoid a short PUCCH or long PUCCH transmission resource collision between terminals.

In step 822, the terminal may receive a downlink control channel from the eNB. The downlink control channel may include the short PUCCH or long PUCCH frequency PRBs, the time OFDM symbol interval, the start OFDM symbol and the end OFDM symbol, the bit field indicating the OFDM symbol in which transmission of the long PUCCH is avoided, information required for slot aggregation (the number of slots belonging to slot aggregation or the number of uplink OFDM symbols), and the available max. time OFDM symbol interval for transmitting the long PUCCH in a plurality of slots belonging to slot aggregation, and the terminal may receive the downlink control channel in order to avoid a short PUCCH or long PUCCH transmission resource collision between terminal as described with reference to FIG. 4 or 7. The downlink control channel may be common information for group terminals or all terminals within the cell or may be dedicated information transmitted only to specific terminals.

In step 823, the terminal may transmit an uplink control channel to the eNB in the short PUCCH or long PUCCH transmission time and frequency resources indicated in step 821 or 822 over a plurality of slots.

Figure 9:
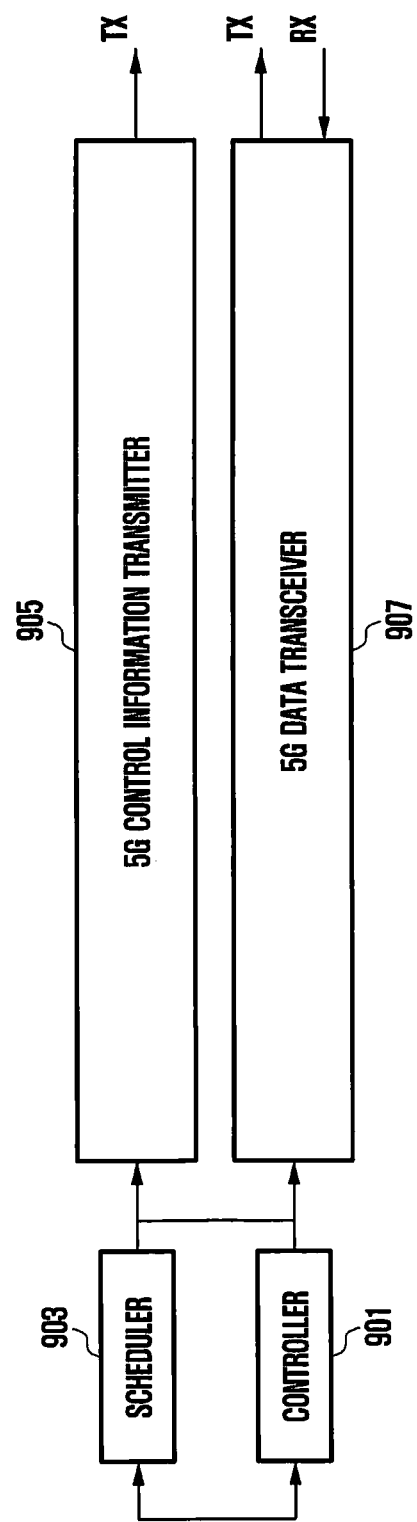
FIG. 9 illustrates an eNB apparatus according to the disclosure.

Next, FIG. 9 illustrates an eNB apparatus according to an embodiment of the disclosure.

Referring to FIG. 9, an eNB may include a controller 901 and a transceiver 907. The eNB may further include a scheduler 905. According to an embodiment of the disclosure, the controller 901 may be defined as a circuit, an application-specific integrated circuit, or at least one processor.

The transceiver 907 may transmit/receive a signal to/from another network entity. For example, the transceiver 907 may transmit a signal to the terminal and receive a signal from the terminal. Alternatively, the transceiver 907 may transmit and receive a signal to and from another eNB.

The controller 901 may control overall operation of the eNB. The controller 901 may control uplink control channel transmission resources according to the eNB procedures illustrated in FIGS. 5A, 5B, 8A, and 8B of the disclosure and the uplink control channel configuration and the method of configuring the uplink control channel in time and frequency transmission resources illustrated in FIGS. 4 and 7 of the disclosure, transmit the uplink control channel to the terminal through a 5G control information transmission device 905 and the 5G data transceiver 907, schedule 5G data through the scheduler 903, and transmit and receive 5G data to and from the 5G terminal through the 5G data transceiver 907.

According to an embodiment of the disclosure, the controller 901 may control the transceiver 907 to transmit PUCCH configuration information including first information on PUCCH resources and second information on the number of slots for repeatedly transmitting the PUCCH.

The controller 910 may control the transceiver 907 to repeatedly receive the PUCCH through slots determined by the terminal on the basis of the PUCCH configuration information and slot format information.

At this time, if the number of slots for repeatedly transmitting the PUCCH is larger than 1 on the basis of the second information, the determined slots may be slots for repeatedly transmitting the PUCCH on the basis of information on the number of consecutive symbols for transmitting the PUCCH and a start symbol at which transmission of the PUCCH starts in each of the PUCCH transmission slots, included in the first information.

Further, if a symbol corresponding to the start symbol is an uplink (UL) symbol and consecutive UL symbols larger than or equal to the number of consecutive symbols for transmitting the PUCCH are included in predetermined slots according to the slot format information, the predetermined symbol may be determined as the slot for repeatedly transmitting the PUCCH.

Meanwhile, the controller 910 may control the transceiver 907 to transmit the PUCCH configuration information and the slot format information through higher layer signaling.

Figure 10:
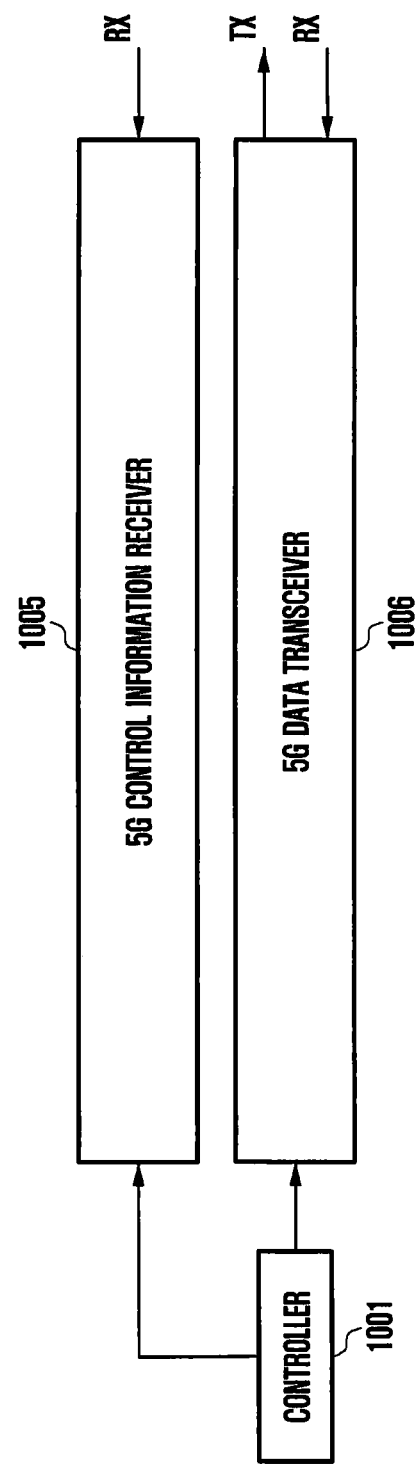
FIG. 10 illustrates a terminal apparatus according to the disclosure.

Next, FIG. 10 illustrates a terminal apparatus according to the disclosure.

Referring to FIG. 10, a terminal may include a controller 1001 and a transceiver 1006. The terminal may further include a 5G control information receiver 1005. According to an embodiment of the disclosure, the controller 1001 may be defined as a circuit, an application-specific integrated circuit, or at least one processor.

The transceiver 1006 may transmit/receive a signal to/from another network entity. For example, the transceiver 1006 may transmit a signal to the terminal and receive a signal from the terminal.

The controller 1001 may control overall operation of the eNB.

The terminal may receive an uplink control channel transmission resource location from the eNB through the 5G control information receiver 1005 and the 5G data transceiver 1006 according to the terminal procedures illustrated in FIGS. 5A, 5B, 8A, and 8B and the method of configuration the uplink control channel and the method of configuring the uplink control channel in time and frequency transmission resources. The controller 1001 may transmit and receive 5G data scheduled at the received resource location to and from the 5G eNB through the 5G data transceiver 1006.

According to an embodiment of the disclosure, the controller 1001 may control the transceiver 1006 to receive PUCCH configuration information including first information on PUCCH resources and second information on the number of slots for repeatedly transmitting the PUCCH. The controller 1001 may determine slots for repeatedly transmitting the PUCCH on the basis of the PUCCH configuration information and slot format information.

If the number of slots for repeatedly transmitting the PUCCH is larger than 1 on the basis of the second information, the controller 1001 may determine slots for repeatedly transmitting the PUCCH on the basis of information on the number of consecutive symbols for transmitting the PUCCH and a start symbol at which transmission of the PUCCH starts in each of PUCCH transmission slots, included in the first information.

If a symbol corresponding to the start symbol is an uplink (UL) symbol and consecutive UL symbols larger than or equal to the number of consecutive symbols for transmitting the PUCCH are included in predetermined slots according to the slot format information, the controller 1001 may determine that the predetermined symbol is the slot for repeatedly transmitting the PUCCH.

The controller 1001 may control the transceiver 1006 to receive the PUCCH configuration information and the slot format information through higher layer signaling.

The embodiments disclosed in the specifications and drawings are provided merely to readily describe and to help a thorough understanding of the disclosure but are not intended to limit the scope of the disclosure. Therefore, it should be construed that, in addition to the embodiments disclosed herein, all modifications and changes or modified and changed forms derived from the technical idea of the disclosure fall within the scope of the disclosure.

The invention claimed is:

1. A method performed by a terminal in a wireless communication system, the method comprising:
    receiving, from a base station, physical uplink control channel (PUCCH) configuration information including first information on PUCCH resources and second information on a number of plural slots for repetition of a PUCCH transmission, second information on a number of consecutive symbols for the PUCCH transmission, and third information on at least one physical resource block (PRB) for the PUCCH transmission;
    receiving, from the base station, downlink control information (DCI);
    determining the plural slots for the repetition of the PUCCH transmission starting from a first slot indicated to the terminal by the DCI, based on the PUCCH configuration information; and
    transmitting, to the base station, a PUCCH at the determined plural slots based on the at least one PRB according to the third information,
    wherein each of the determined plural slots has the number of consecutive symbols for the PUCCH transmission according to the second information, and
    wherein the terminal does not perform the PUCCH transmission at a slot having a number of symbols available for PUCCH transmission smaller than the number of consecutive symbols for the PUCCH transmission according to the second information.

2. The method of claim 1,
    wherein determining the plural slots for the repetition of the PUCCH transmission comprises determining, based on slot format information, a slot, having a number of consecutive uplink symbols equal to or larger than the number of consecutive symbols for the PUCCH transmission according to the second information, as each of the plural slots for the repetition of the PUCCH transmission.

3. The method of claim 2,
    wherein the slot format information is configured by a semi-static method.

4. The method of claim 1,
    wherein the third information comprises information on an index of a first PRB and information on an index of a second PRB, and
    wherein the PUCCH transmission according to the first PRB and the second PRB is the same at each of the determined plural slots.

5. A terminal in a wireless communication system, the terminal comprising:
    a transceiver; and
    a controller coupled with the transceiver and configured to:
    receive, from a base station via the transceiver, physical uplink control channel (PUCCH) configuration information including first information on a number of plural slots for repetition of a PUCCH transmission, second information on a number of consecutive symbols for the PUCCH transmission, and third information on at least one physical resource block (PRB) for the PUCCH transmission,
    receive, from the base station via the transceiver, downlink control information (DCI),
    determine the plural slots for the repetition of the PUCCH transmission starting from a first slot indicated to the terminal by the DCI, based on the PUCCH configuration information, and
    transmit, to the base station via the transceiver, a PUCCH at the determined plural slots based on the at least one PRB according to the third information,
    wherein each of the determined plural slots has the number of consecutive symbols for the PUCCH transmission according to the second information, and
    wherein the terminal does not perform the PUCCH transmission at a slot having a number of symbols available for PUCCH transmission smaller than the number of consecutive symbols for the PUCCH transmission according to the second information.

6. The terminal of claim 5,
wherein the controller is configured to determine, based on slot format information, a slot, having a number of consecutive uplink symbols equal to or larger than the number of consecutive symbols for the PUCCH transmission according to the second information, as each of the plural slots for the repetition of the PUCCH transmission.

7. The terminal of claim 6,
wherein the slot format information is configured by a semi-static method.

8. The terminal of claim 5,
wherein the third information comprises information on an index of a first PRB and information on an index of a second PRB, and
wherein the PUCCH transmission according to the first PRB and the second PRB is the same at each of the determined plural slots.

9. A method performed by a base station in a wireless communication system, the method comprising:
transmitting, to a terminal, physical uplink control channel (PUCCH) configuration information including first information on a number of plural slots for repetition of a PUCCH transmission, second information on a number of consecutive symbols for the PUCCH transmission, and third information on at least one physical resource block (PRB) for the PUCCH transmission;
transmitting, to the terminal, downlink control information (DCI); and
receiving, from the terminal, a PUCCH at the plural slots based on the at least one PRB according to the third information,
wherein the plural slots is determined based on the PUCCH configuration information, starting from a first slot indicated to the terminal by the DCI,
wherein each of the determined plural slots has the number of consecutive symbols for the PUCCH transmission according to the second information, and
wherein the PUCCH transmission is not performed at a slot having a number of symbols available for PUCCH transmission smaller than the number of consecutive symbols for the PUCCH transmission according to the second information.

10. The method of claim 9,
wherein a slot, having a number of consecutive uplink symbols equal to or larger than the number of consecutive symbols for the PUCCH transmission according to the second information, is determined as each of the plural slots for the repetition of the PUCCH transmission, based on slot format information, and
wherein the slot format information is configured by a semi-static method.

11. The method of claim 9,
wherein the third information comprises information on an index of a first PRB and information on an index of a second PRB, and
wherein the PUCCH transmission according to the first PRB and the second PRB is the same at each of the determined plural slots.

12. A base station in a wireless communication system, the base station comprising:
a transceiver; and
a controller coupled with the transceiver and configured to:
transmit, to a terminal via the transceiver, physical uplink control channel (PUCCH) configuration information including first information on a number of plural slots for repetition of a PUCCH transmission, second information on a number of consecutive symbols for the PUCCH transmission, and third information on at least one physical resource block (PRB) for the PUCCH transmission,
transmit, to the terminal via the transceiver, downlink control information (DCI), and
receive, from the terminal via the transceiver, a PUCCH at the plural slots based on the at least one PRB according to the third information,
wherein the plural slots is determined based on the PUCCH configuration information, starting from a first slot indicated to the terminal by the DCI,
wherein each of the determined plural slots has the number of consecutive symbols for the PUCCH transmission according to the second information, and
wherein the PUCCH transmission is not performed at a slot having a number of symbols available for PUCCH transmission smaller than the number of consecutive symbols for the PUCCH transmission according to the second information.

13. The base station of claim 12,
wherein a slot, having a number of consecutive uplink symbols equal to or larger than the number of consecutive symbols for the PUCCH transmission according to the second information, is determined as each of the plural slots for the repetition of the PUCCH transmission, based on slot format information.

14. The base station of claim 13,
wherein the slot format information is configured by a semi-static method.

15. The base station of claim 12,
wherein the third information comprises information on an index of a first PRB and information on an index of a second PRB, and
wherein the PUCCH transmission according to the first PRB and the second PRB is the same at each of the determined plural slots.

* * * * *